(12) United States Patent
Hirotsune et al.

(10) Patent No.: US 6,703,098 B2
(45) Date of Patent: Mar. 9, 2004

(54) INFORMATION RECORDING MEDIUM AND METHOD FOR MANUFACTURING INFORMATION RECORDING MEDIUM

(75) Inventors: Akemi Hirotsune, Saitama (JP); Motoyasu Terao, Hinode (JP); Junko Ushiyama, Kokubunji (JP); Hiroyuki Minemura, Kokubunji (JP); Keikichi Andoo, Musashino (JP); Yumiko Anzai, Ome (JP); Makoto Miyamoto, Ome (JP)

(73) Assignee: Hitachi, Ltd., Tokyo (JP)

( * ) Notice: Subject to any disclaimer, the term of this patent is extended or adjusted under 35 U.S.C. 154(b) by 13 days.

(21) Appl. No.: 10/076,646

(22) Filed: Feb. 19, 2002

(65) Prior Publication Data
US 2003/0064211 A1 Apr. 3, 2003

(30) Foreign Application Priority Data

Jul. 12, 2001 (JP) .................... 2001-211519
Oct. 11, 2001 (JP) .................... 2001-313405

(51) Int. Cl.$^7$ ................................ B32B 3/02
(52) U.S. Cl. .................. 428/64.1; 428/64.5; 428/64.6; 430/270.13

(58) Field of Search .................. 428/64.1, 64.4, 428/64.5, 64.6, 913; 430/270.13, 495.1, 945; 369/275.4

(56) References Cited

U.S. PATENT DOCUMENTS 6,268,034 B1 * 7/2001 Kitaura .................. 428/64.1

FOREIGN PATENT DOCUMENTS

| JP | 08-258418 | 3/1995 |
| JP | 2000-076703 | 8/1998 |
| JP | 2001-035013 | 7/1999 |

* cited by examiner

Primary Examiner—Elizabeth Mulvaney

(57) ABSTRACT

A multi-time rewritable information recording medium conducting writing by the change of arrangement of atoms under the irradiation of light, comprising, from the light-incident side, a substrate of a thickness of 0.7 mm or less, a lower protective layer of a thickness of 20 nm to 60 nm, a recording film, an upper protective layer, and a reflective layer, wherein the interval between tracks is 0.62 μm or less. The medium can also possess favorable writing/reading characteristics at high density writing/reading, have large processing margin, use a manufacturing apparatus at a reduced cost, cut material cost, and realize mass productivity with less stresses.

4 Claims, 15 Drawing Sheets

Ws : BEAM SPOT DIAMETER
Wm : MARK LENGTH
d : RESOLUTION

ABSORPTIVITY : CRYSTALLINE STATE > AMORPHOUS STATE

INFORMATION RECORDING MEDIUM AND METHOD FOR MANUFACTURING INFORMATION RECORDING MEDIUM

BACKGROUND OF THE INVENTION

1. Field of the Invention

This invention concerns an information recording medium for use in optical disks.

2. Description of Related Art

For recording information on thin films (recording films) by irradiation of a laser beam, various principles have been known. Among them, those utilizing the change of the arrangement of atoms by the irradiation of a laser beam such as phase change of the film material (also referred to as phase transfer and phase transformation) scarcely cause deformation of the thin films and, accordingly, have an advantage capable of obtaining an information recording medium of a both side disk structure by directly bonding two sheets of disk members.

Usually, the information recording medium described above has a constitution comprising a protective layer, a recording film such as made of a GeSbTe series material, a protective layer and a reflective layer formed on a substrate.

In this specification, the term "phase change" includes not only the phase change between a crystalline state and an amorphous state but also includes phase change between melting (change to liquid phase) and recrystallization, as well as phase change between a crystalline state and another crystalline state. Further, "mark-edge recording" means a recording system of corresponding an edge area of a recording mark to signal "1" and inter mark and intra mark areas to signal "0". In this specification, the optical disk means a disk containing information that can be regenerated by the irradiation of light and/or a device for regenerating information by the irradiation of light.

In a rewritable optical disk such as DVD-RAM, a recording track comprises a pre-formatted area in which address pits are disposed and a user-data area having a tracking groove for recording and conducts information writing or reading after confirming the address and detecting clocks or synchronization signals.

However, since deformation formed by stresses exerting between stacked films and a substrate is different between the pre-formatted area and the user-data area, the recording track is bent relative to the pre-formatted area. This may cause a situation the address data in the pre-formatted area can not be read, assuming a case of push-pull tracking relative to the tracking groove, at a high recording track density with a recording track width of 0.62 $\mu$m or less for an optical spot diameter represented by $\lambda$/NA of about 0.96 $\mu$m. This may also cause offset in a recording area to partially erase data of adjacent tracks when tracking offset is corrected so as to situate at a normal position relative to the pre-formatted area.

It is considered that the deformation is different between the pre-formatted area in which address pitch are disposed and the user-data area for recording because the user-data area has tracking grooves and the inclined portion of the grooves undergoes force and tends to deform. Further, as another problem caused by the stresses exerting between the stacked films and the substrate, when a number of tracks are rewritten by overwriting for multi-cycles, the substrate of the surface tends to thermally expand and deform by during recording and the tracking grooves are bent in the direction of undergoing the force by the stress exerting from the stacked films to the substrate. Bending occurs remarkably toward the vicinity of the center for the multi-time recording area for 500 cycles or more.

In view of the above, this invention intends to overcome such problems and provide an information recording medium with no deformation of tracking grooves caused by stresses between stacked films and a substrate upon high density writing/reading, capable of possessing favorable writing/reading characteristics, having large process margin, capable of using a manufacturing apparatus at a reduced cost, excellent in view of material cost and mass productivity and with less stresses.

SUMMARY OF THE INVENTION

For overcoming the foregoing problems, the information recording medium according to this invention adopts the following countermeasures. That is, the temperature of the substrate is kept as low as possible. When the temperature of the substrate rises during film preparation and the film is deposited in an expanded state and then cooled, the stress from the substrate to the films changes in the direction of increasing the compressive stress. This invention intends to prevent occurrence of stresses by keeping the temperature of the substrate from rising.

Specifically, this invention provides multi-time rewritable information recording media as described below.

(1) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, with the interval between tracks being 0.62 $\mu$m or less.

(2) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which 90 atomic % or more for the material of the reflective layer comprises any one of Cr, Cr—Al, Cr—Ag, Cr—Au, Cr—Ge, or a Cr alloy as a main ingredient, an Al alloy such as Al—Ti, Al—Cr, Al—Co as a main ingredient, or Ge—Cr, Ge—Si, Ge—N, Co, Ni, Mo, Pt, W, Ge, Sb, Bi, Ag, Au or Cu.

(3) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which 90 atomic % or more for the material of the lower protective layer comprises any one of oxides of:

$ZnS$—$SiO_2$, $ZnS$—$Al_2O_3$, $ZnS$—$Ta_2O_5$, $ZnS$—$SnO_2$, $ZnS$—$In_2O_3$, $ZnS$—$TiO_2$, $ZnS$—$Cr_2O_3$, $ZnS$—$ZnO$ or $ZnO$, $SiO_2$, $Al_2O_3$, $Ta_2O_5$, $SnO_2$, $In_2O_3$, $TiO_2$, $SnO_2$—$In_2O_3$, $Cr_2O_3$, $ZnO$—$SiO_2$, $Al_2O_3$—$SiO_2$, $Ta_2O_5$—$SiO_2$, $SnO_2$—$SiO_2$, $In_2O_3$—$SiO_2$, $TiO_2$—$SiO_2$, $SnO_2$—$In_2O_3$—$SiO_2$, $Cr_2O_3$—$SiO_2$, $ZnO$—$Al_2O_3$, $Ta_2O_5$—$Al_2O_3$, $SnO_2$—$Al_2O_3$, $In_2O_3$—$Al_2O_3$, $TiO_2$—$Al_2O_3$, $SnO_2$—$In_2O_3$—$Al_2O_3$ and $Cr_2O_3$—$Al_2O_3$, a mixture of the materials described above and the material formed by partially or entirely substituting the material described above with a nitride.

(4) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film; an upper protective layer and a reflective layer from the light-incident side, in which
   90 atomic % or more for the material of the lower protective layer comprises any one of $ZnO$—$In_2O_3$, $SnO_2$, $SnO_2$—$In_2O_3$, $ZnO$—$SiO_2$, $SnO_2$—$In_2O_3$—$SiO_2$.

(5) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which
   90 atomic % or more for the material of the upper protective layer comprises any one of oxides of:
   $ZnS$—$SiO_2$, $ZnS$—$Al_2O_3$, $ZnS$—$Ta_2O_5$, $ZnS$—$SnO_2$, $ZnS$—$In_2O_3$, $ZnS$—$TiO_2$, $ZnS$—$Cr_2O_3$, $ZnS$—$ZnO$ or $ZnO$, $SiO_2$, $Al_2O_3$, $Ta_2O_5$, $SnO_2$, $In_2O_3$, $TiO_2$, $SnO_2$—$In_2O_3$, $Cr_2O_3$, $ZnO$—$SiO_2$, $Al_2O_3$—$SiO_2$, $Ta_2O_5$—$SiO_2$, $SnO_2$—$SiO_2$, $In_2O_3$—$SiO_2$, $TiO_2$—$SiO_2$, $SnO_2$—$In_2O_3$—$SiO_2$, $Cr_2O_3$—$SiO_2$, $ZnO$—$Al_2O_3$, $Ta_2O_5$—$Al_2O_3$, $SnO_2$—$Al_2O_3$, $In_2O_3$—$Al_2O_3$, $TiO_2$—$Al_2O_3$, $SnO_2$—$In_2O_3$—$Al_2O_3$ and $Cr_2O_3$—$Al_2O_3$, a mixture of the materials described above and the material formed by partially or entirely substituting the material described above with a nitride.

(6) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which
   90 atomic % or more for the material of the upper protective layer comprises any one of a mixed material comprising $ZnS$—$SiO_2$, $ZnS$—$Al_2O_3$, $ZnS$—$Ta_2O_5$, $ZnS$—$SnO_2$, $ZnS$—$In_2O_3$, $ZnS$—$TiO_2$, $ZnS$—$Cr_2O_3$, $ZnS$—$SiO_2$, $ZnS$—$Al_2O_3$, $Zns$—$Ta_2O_5$ and $ZnS$—$Cr_2O_3$ in which the compositional ratio of ZnS is 60 mol % to 90, or a mixed material comprising $ZnS$—$SnO_2$, $ZnS$—$In_2O_3$. $ZnS$—$TiO_2$ and $ZnS$—$ZnO$ in which the compositional ratio of ZnS is 50 mol % to 85 mol %.

(7) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which
   95 atomic % or more for the material of the recording film comprises Ge—Sb—Te.

(8) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer and a reflective layer from the light-incident side, in which
   the thickness of the recording film is 7 nm or more and 13 nm or less.

(9) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer, a reflective layer and at least one interface layer from the light-incident side, in which
   95 atomic % or more for the material of the at least one interface layer comprises any one of $Cr_2O_3$, Cr—N, Ge—N, Sn—N, Ge—O or a mixture of such materials; $SiO_2$, $Al_2O_3$, $Ta_2O_5$, or a mixture of $Ta_2O_5$ and $Cr_2O_3$ or Cr—N, Ge—N, or Ge—O; $ZrO_2$, $Y_2O_3$, $Cr_2O_3$, or a mixture of CrN, GeN, $Ta_2O_5$; CoO, $Cr_2O$, NiO, AlN, BN, CrN, GeN, HfN, $Si_3N_4$, Al—Si—N series material; Si—N series material; Si—O—N series material; and nitrides such as TaN, TiN, and ZrN.

(10) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer, a reflective layer and at least one interface layer from the light-incident side, in which
   95 atomic % or more for the material of the at least one interface layer comprises $Cr_2O_3$.

(11) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer, a reflective layer and at least one interface layer from the light-incident side, in which
   95 atomic % or more for the material of the at least one interface layer comprises Sn—N.

(12) A multi-time rewritable information recording medium conducting recording by the change of arrangement of atoms under the irradiation of light, comprising a substrate of a thickness of 0.7 mm or less, a lower protective layer of a thickness of 20 to 60 nm, a recording film, an upper protective layer, and a reflective layer from the light-incident side, in which
   the total for the thickness of the entire stacked films containing each of the layers described above is 150 nm or less.

(13) A multi-time rewritable information recording medium conducting writing by the change of arrangement of atoms under the irradiation of light, comprising a substrate of a thickness of 0.7 mm or less, a lower protective layer of a thickness of 20 to 60 nm, a recording film, an upper protective layer, and a reflective layer from the light-incident side, in which
   the reflectance in a crystalline state at each wavelength as viewed on the side of the substrate is higher than the reflectance in an amorphous state at each wavelength in the entire wavelength in a range of 500 nm to 600 nm.

(14) A multi-time rewritable information recording medium conducting writing by the change of arrangement of atoms under the irradiation of light, comprising a substrate of a thickness of 0.7 mm or less, a lower protective layer of a thickness of 20 to 60 nm, a recording film, an upper protective layer, and a reflective layer from the light-incident side, in which
   the transmittance in an amorphous state and in a crystalline state is about 2% or more at least at one wavelength in a range from 610 to 710 nm.

(15) An information recording medium as defined in any one of (2)–(14) above wherein the distance between the tracks of the medium is 0.62 µm or less.

(16) A multi-time rewritable information recording medium conducting writing by the change of arrangement of atoms under the irradiation of light, comprising a substrate of a thickness of 0.7 mm or less, a lower protective layer of a thickness of 20 nm to 60 nm, a recording film, an upper protective layer, a reflective layer, and an interface layer in which 95 atomic % or more in the composition comprises $SnO_2$ or Sn—O—N from the light-incident side.

(17) A multi-time rewritable information recording medium conducting writing by the change of arrangement of atoms under the irradiation of light, comprising a substrate of a thickness of 0.7 mm or less, a lower protective layer of a thickness of 20 nm to 60 nm or less, a recording film, an upper protective layer, in which 95 atomic % or in the composition comprises $SnO_2$ or Sn—O—N, and a reflective layer.

(18) A multi-time rewritable information recording medium conducting writing by the change of arrangement of atoms under the irradiation of light, comprising a substrate, a stacked films including,
a lower protective layer with a thickness of 20 nm to 60 nm, a recording film, an upper protective layer and a reflective layer from the light-incident side, and
an adhesive layer from the light-incident side, in which the distance from the surface of the substrate to the adhesive layer is 150 nm or less, the thickness for each of the stacked films is 40 nm or less and the interval between the tracks is 0.54 $\mu$m to 0.62 $\mu$m.

(19) A multi-time rewritable information recording medium conducting writing by the change of arrangement of atoms under the irradiation of light, comprising a substrate, a stacked films including,
a lower protective layer with a thickness of 20 nm to 40 nm, a recording film, an upper protective layer and a reflective layer from the light-incident side, and
A an adhesive layer from the light-incident side, in which the reflective layer is two or more reflective layers comprising 80 atomic % or more of a metal,
the distance from the surface of the substrate to the adhesive layer is 150 nm or less, the thickness of the film in each of the stacked films is 40 nm or less and the distance between the tracks is 0.54 $\mu$m to 0.62 $\mu$m.

(20) A multi-time rewritable information recording medium conducting writing by the change of arrangement of atoms under the irradiation of light, comprising a substrate, a stacked films including,
a lower protective layer with a thickness of 20 nm to 60 nm, a recording film, an upper protective layer and a reflective layer from the light-incident side, and
an adhesive layer from the light-incident side, in which the distance from the surface of the substrate to the adhesive layer is 90 nm to 150 nm, and
the distance between the tracks is 0.54 $\mu$m to 0.62 $\mu$m.

It is also important to define the total thickness of the stacked films to 150 nm or less for preventing occurrence of stresses.

When the thickness for the lower protective layer or other layers is reduced, it requires a countermeasure for optically ensuring reproduced signals, reflectance, and absorptivity in a optimal range, or a countermeasure for thermally preventing undesired effects of expansion due to the temperature elevation on the surface of the substrate and preventing recrystallization at the periphery of the recording mark, erase of adjacent tracks and erase by the reading light due to the change of heat diffusion.

The method of measuring the groove deformation caused by the stress is as described below.

The method of measuring the stress deformation amount of groove is to be explained. This is explained here in details only to a case of measuring the stress deformation amount of groove in the grooves as an example.

A disk to be measured is set to an evaluation tester and rotated. Then, an optical head is moved to the vicinity of a track for which the stress deformation amount of groove is to be measured. Auto-focusing is applied at that position and a tracking area signal (differential signal) is monitored by an oscilloscope. Then, the gain of the auto-focus is controlled such that the tracking error signal amplitude becomes maximum (AF offset control). Then, tracking is applied to the groove in a state of applying the auto-focusing. Then, writing is conducted while changing the laser power by random signals, a recording power to make the displacement (asymmetry) of the center line for an envelope of signals corresponding to 3T (shortest) mark and space from the center line for an envelope of signals corresponding to long mark and space to 5%, is determined and defined as an optimal recording power. Then, a relation between the radial (radial direction) tilt and a jitter value after 10 cycles of overwriting (optimal power) is measured by a time interval analyzer (TIA) to determine a radial tilt to minimize the jitter. That is, while varying the radial tilt, the current jitter is measured and the radial tilt to minimize the jitter is determined and defined as an optimal radial tilt. Then, tracking offset control is conducted. At first, overwriting is conducted for ten cycles at the optimal power to the lands on both sides of the groove. Subsequently, cross talk from the land in the groove is measured by a spectral analyzer. The tracking gain is controlled so as to minimize the cross talk. Then, it is further preferred to subsequently determine the optimal radial again and, further, applying tracking offset control.

Finally, after completing the AF offset control, tracking offset control and radial tilt control in the groove, the beam is moved to a track for measuring the stress deformation amount of groove. A reproduced signal for an ID area (area expressing address information or the like with pit) arranged being displaced each by ½ track on the right and left of the track is measured (added signal) is monitored, and voltage amplitude V1 and voltage amplitude V3 of ID1 and ID3 are measured respectively. Based on the values, |(V1−V3)/(V1+V3)| is calculated.

In the same manner, the stress deformation amount of groove in the land is measured.

This invention provides an advantageous effect in a case of a recording density (track pitch, bit pitch) higher than 2.6 GB DVD-RAM standards and, particularly, in a case of recording density of higher than 4.7 GB DVD-RAM standards. Where the wavelength of an optical source is not at the vicinity of 660 nm or the numerical aperture (NA) of a condensing lens is not 0.6, the invention provides an advantageous effect at a recording density, in which they are converted both in the radial direction and the circumferential direction by wavelength ratio and NA ratio.

The basic technique in the recording device using the phase change recording medium according to this invention (optical disk drive) is as described below.

(1 Beam Overwrite)

The phase change recording medium is usually rewritten by overwriting (information rewriting by overwriting with no previous erase). FIG. 2 shows the principle. When a recording film is melt by a high laser power, a recording mark in an amorphous state is formed by quenching after irradiation irrespective whether the previous state is a crystalline state or an amorphous state. When the recording film is heated to a temperature below a melting point at which the crystallization velocity is high by an intermediate laser power, an area which was previously in an amorphous state is changed into a crystallization state. An area originally in a crystalline state remains as crystalline. Since it is considered that DVD-RAH often records moving pictures, it records long information all at once. In this case, recording after previously erasing the entire information takes twice time and it may requires an enormous capacity of buffer memory. Accordingly, overwritability is an essential condition.

(Mark Edge Recording)

DVD-RAM and DVD-RW adopt a mark edge recording system capable of attaining high density recording. The mark edge recording corresponds the positions at both ends of a recording mark formed on a recording film to digital data "1". This can increase the density by corresponding the length of the shortest recording mark to 2–3 instead of 1 of the reference clock. DVD-RAM adopts a 8–16 modulation system and corresponds to three reference clocks. As shown in FIG. 3 by comparison, it has an advantage capable of high density recording without extremely reducing the recording mark compared with a mark position recording of corresponding the central position of the circular recording mark to digital data "1". However, it is required for a recording medium that the shape deformation of the recording mark is extremely small.

(Format)

As an arrangement for the header area at the beginning of such sector shown in FIG. 4, since DVD-RAM has a format of dividing one circumference into 24 sectors, it enables random access recording. Thus, it can be used in a wide application use including personal computer incorporated memory devices, as far as DVD video cameras and DVD video recorders.

(Land/Groove Recording)

As shown in FIG. 5, DVD-RAM decreased cross talk by land/groove recording of recording both inside of the tracking grooves and convex portion between the grooves. Since the land/groove recording utilizes a phenomenon that the recording marks in adjacent tracks become less visible both in the land and in the groove when the groove depth is defined near $\lambda/6n$ ($\lambda$: laser wavelength, n: substrate refractive index) relative to bright and dark (dense and thin) recording mark, the track pitch can be narrowed as 0.615 $\mu$m in an example of 4.7 GB DVD-RAM. It is required for the phase difference between the recording mark and other portions than described above, that is, the phase differential component of the reproduced signal is designed such that it exerts in the direction tending to cause cross talk and reduce the same sufficiently. Since the phase differential components of the reproduced signal are added in an inverse phase to the dense/thin reproduced signals of the land and the groove, it also causes unbalance in the reproduced levels between the land and the groove.

(ZCLV Recording System)

In the phase change recording medium, when the recording waveform is not changed, it is desirable to record at an optimum linear velocity corresponding to the crystallization rate for obtaining favorable writing/reading characteristics. However, upon access between recording tracks of different radii on the disk, it takes much time for changing the number of rotation for making the linear velocity identical. In view of the above, as shown in FIG. 6, DVD-RAM adopts a ZCLV (Zoned Constant Linear Velocity) system of dividing the radial direction of a disk into 24 zones and making the number of rotation constant in one zone and change the number of rotation only when other zone is to be accessed. In this system, since the linear velocity is somewhat different between the inner most circumferential track and the outermost circumferential track in the zone, the recording density also differs somewhat but recording can be done substantially at the maximum density over the entire disk region.

The technique for the recording medium according to this invention is as described below.

(Absorptivity Adjustment)

In a high linear velocity (8.2 m/s) medium such as a 4.7 GB/face medium, since previous erase that can be expected in a low linear velocity (6 m/s) medium such as 2.6 GB/face DVD-RAM of DVD-RAM (a phenomenon in which a recording mark is previously erased in a band-like area within a temperature range from 300° C. to 500° C. ahead of the area in which the recording film is melted by beam spot irradiation) can no more be expected sufficiently, it is essential to keep the absorptivity ratio Ac/Aa between inside and outside of the recording mark to 0.8 or more. By the absorptivity adjustment, the edge portion of the mark can be recorded exactly as shown in FIG. 7. The absorptivity adjustment includes a method of reducing the thickness of the reflective layer to transmit a light such that light absorption to the recording film is not increased in a recording mark portion at a low reflectance (Noboru Yamada, Nobuo Akahira, Kenichi Nichiuchi, and Keisho Fukukawa: High Speed Overwrite Phase Change Optical Disk: Electronic Information Communication Society, Technical Study Report MR 92–71, CPM 92–148 (1992) 37). Cr, Al and an alloy containing one of them is used for the reflective layer in order for the absorptivity ratio adjustment and for keeping the contrast high. The layer properly absorbs light while properly transmits light such that light transmitting the recording film at a recording mark portion of low reflectance is reflected at the reflective layer and is again absorbed in the recording film to prevent temperature from rising excessively and adjust the ratio Ac/Aa to 1 or greater.

In a high density phase change optical disk, since the track pitch is narrow, it is necessary to take a consideration for the phenomenon referred to as a cross erase in which a portion of the recording mark already written in adjacent tracks is erased. In order to prevent cross erase, the heat diffusion in the vertical direction is important. One of the reason for this is that heat less conducts in the direction of the adjacent tracks by vertical diffusion. When Ac/Aa is greater than 1, temperature elevation is reduced in the recording mark area of adjacent tracks and this serves positively in view of prevention of cross erase.

For preventing the cross erase, prevention of recrystallization is also important. As shown in FIG. 8, in a case where a portion remaining as an amorphous recording mark is narrowed by recrystallization from the periphery after the melting of the recording film upon recording, it is necessary to melt a more wide area for forming a recording mark of a predetermined size, which tends to rise the temperature of adjacent tracks. When heat dissipates in the vertical direction, this can prevent recrystallization. This can also prevent heat in the central portion from dissipating laterally during formation of the recording mark to retard cooling in the periphery of the molten area and facilitate crystallization.

(Lower Protective Layer)

The lower protective layer is a stacked film of a thickness of 20 nm or more disposed between a substrate and a recording film for protecting the recording film. For suppressing the groove deformation of the substrate, it is necessary to restrict the thickness of the lower protective layer so that the substrate temperature does not rise during film preparation. In view of the above, the lower protective layer is disposed to a thickness of 20 nm to 60 nm. For increasing the contrast optically, the refractive index is preferably 1.4 to 1.9. However, since the material of low refractive index generally has slow sputtering rate and, accordingly, the refractive index is preferably from 1.6 to 1.9 in view of the mass productivity. The extinction coefficient k is preferably approximate to 0 as much as possible. Further, since the thermal conductivity of the layer is higher than that of the recording film by one digit or more, the symmetricity of the heat diffusion from the recording film in the vertical direction increases, symmetricity for the characteristics between land and groove are increased and, it also had an effect of preventing cross erase which likely to occur most particularly in the groove. Since the substrate deformation occurs upon multi-time rewriting for 500 cycles or more if the thickness of the layer is less than 20 nm, it is preferred that the thickness is 20 nm or more in order to prevent this. While the reflectance is lowered as the recording film is made thinner it can be compensated with the reflectance improving layer. However, when the thickness is further reduced, the reflectance difference between the crystalline state and the amorphous state, the reproducing signal intensity itself is smaller and it can not be thinned further.

(Interface Layer)

In 4.7 GB DVD-RAM, interface layers made of oxide or nitride are disposed on both sides of a recording film (Yasushi Miyauchi, Motoyasu Terao, Akemi Hirotsune, Makoto Miyamaoto, Nobuhiro Tokushuku: Prevention of Inter Diffusion between Protective Layer—Recording Film of Phase Change Optical Disk by Oxide Interface Layer; Pre-text for the Meeting of the Society of Applied Physics, Part 3, 29p-ZK-12 (Spring, 1998) 1127). Both the crystal nuclei forming rate and the crystal growing rate increase compared with the case where $(ZnS)_{80}(SiO_2)_{20}$ protective layers are present on both sides, which increases the crystallization rate. In an example of 4.7 GB DVD-RAM, since a next recording pulse arrives before the solidification after irradiation of one recording pulse by the use of a recording waveform not lowering the power than the erase power level and by reduction of difference for the position between recording pulses adjacent before and after on the recording track by increased density, so that material transfer (flow) of the recording film tends to occur. For improving this, it is effective to reduce the thickness of the recording film thereby relatively enhancing the effect of deposition force to the layers on both sides. However, this lowers both the crystal nuclei forming rate and the crystal growing rate to possibly cause partial erase residue of the amorphous recording mark. However, the worry of occurrence of erase residue is eliminated by the use of both interface layers, for example, made of oxide. Use of nitride is also possible (Mayumi Otowa, Noboru Yamada, Hiroyuki Ohata, Katsumi Kawahara: Phase Change Optical Disk Having Nitride Layers on Both Sides of a Recording Film: Pre-text for the Meeting of the Society of Physics, Third part, 29p-ZK-13 (Spring, 1998) 1128 and N. Yamada, M. Otowa, N. Miyagawa, H. Ohta, N. Akahira and T. Matsunaga: Phase-Change Optical Disk Having a Nitride Interface Layer; Jpn. J. Appl. Phys. Part 1, 37 (1998) 2104)

For the multi-time rewriting, diffusion of Zn, S or the like from upper and lower $ZnS.SiO_2$ protective layers into the recording film has to be prevented. The interface layer also has an effect. In the recording medium, jitter which is a fluctuation of the edge position of the recording mark increases by about 1% at the initial rewriting and the jitter increases or decreases little by little till 1000 cycles of rewriting but this cause no problem at all for the data error. Further, as a result of an acceleration life test, it has been found that the storing life of the recorded data is at least 10 years or more.

(Recording Waveform)

The following relation exists between the recording waveform and the recording mark shape. For example, in 4.7 GB DVD-RAM, since the shortest mark length is 0.42 μm and the linear velocity is 8.2 m/s, a recording pulse for forming one recording mark is divided into two or more. For forming the recording mark exactly, thus, used is a recording waveform in which a portion lowered from the erasing power level is to be decreased or to be absent at all as shown in FIG. 9 while attaching importance to an accurate heating rather than prevention of heat accumulation. Further, as has been already described above, it is also necessary to apply adaptive control for the width of the initial pulse and the last pulse forming the recording mark (adaptive control: an ending position for the last pulse forming the preceding mark and a starting position for the initial pulse forming the succeeding mark are adjusted in accordance with the length of the space to be noted and the length of the preceding mark).

Technique for improving the performance is summarized as below.

1. Technique contributing to narrowing of track pitch
    Land/groove recording, absorptivity adjustment, reduction of thickness in the lower protective layer, reduction of thickness in the reflective layer.
2. Technique contributing to narrowing of pit pitch
    Mark edge recording, ZCLV recording system, absorptivity adjustment, interface layer, adaptively controlled recording waveform.
3. Technique contributing to increase of speed
    1 beam overwrite, recording film composition, absorptivity adjustment, interface layer As described above, one layer has plural functions and the functions of respective layers are combined in a complicate manner. Reduction in the stress by the reduction of the thickness for the lower protective layer also prevents groove deformation thereby contributing to narrowing of the track pitch. Accordingly, it is extremely important for improving the performance to optimally select the combination and the film thickness of the stacked films.

DETAILED DESCRIPTION OF THE PREFERRED EMBODIMENTS

This invention is to be described in details by way of examples.

EXAMPLE 1

(Constitution and Manufacturing Method of an Information Recording Medium According to This Invention)

Figure 1:
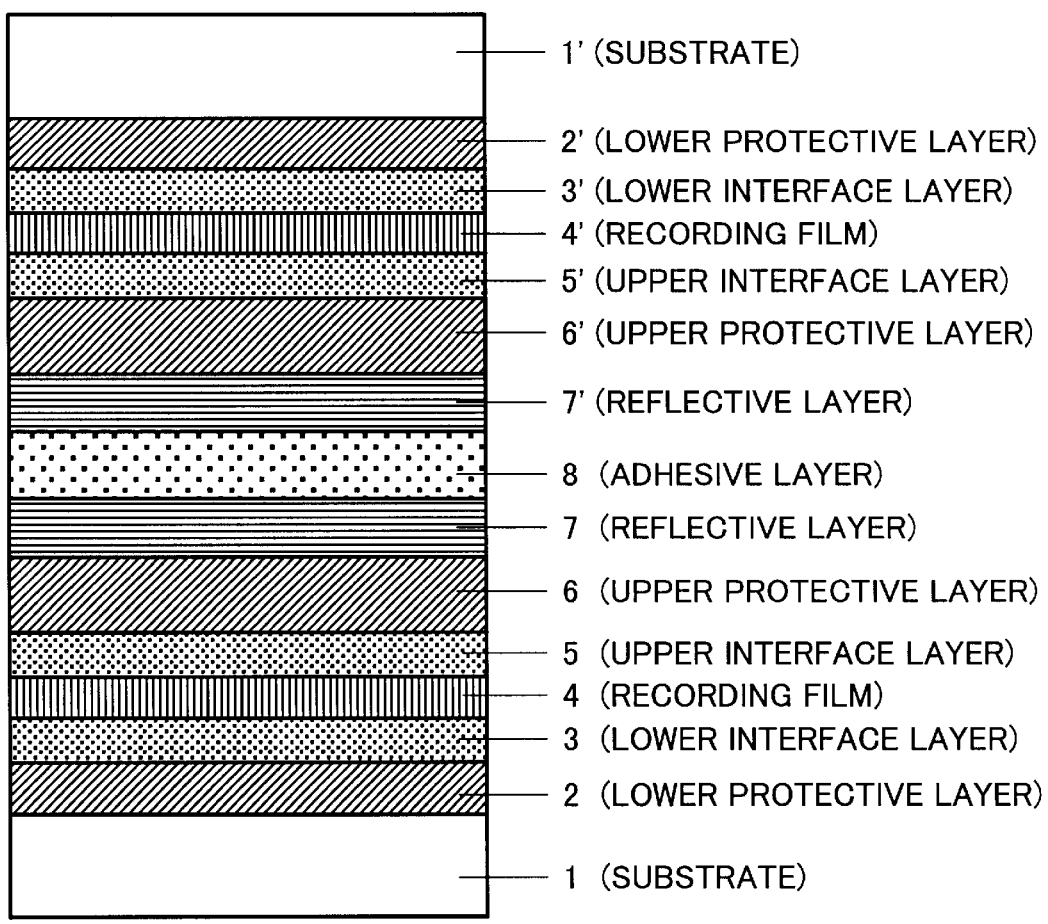
FIG. 1 is a schematic cross sectional view for an example of an information recording medium according to this invention.
Figure 2:
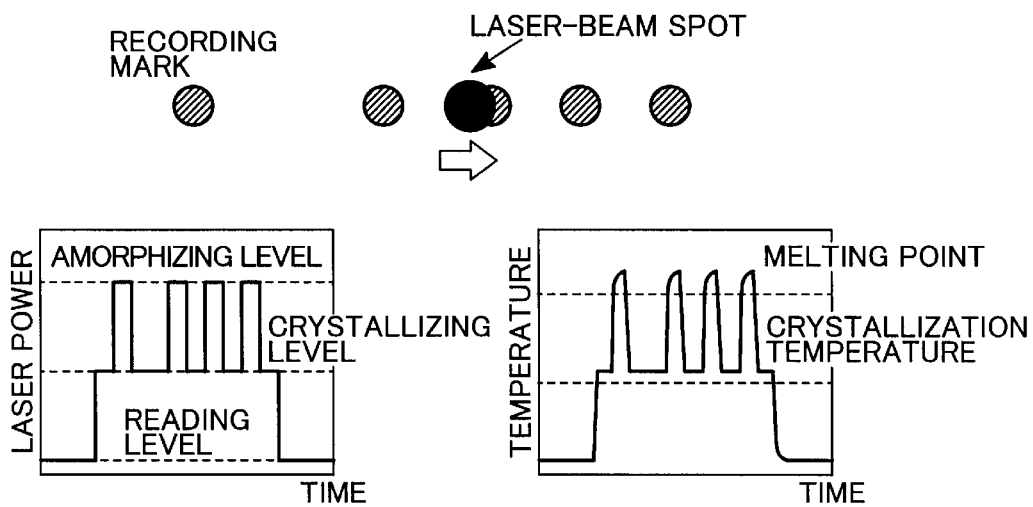
FIG. 2 is an explanatory view for the principle of overwriting.
Figure 3:
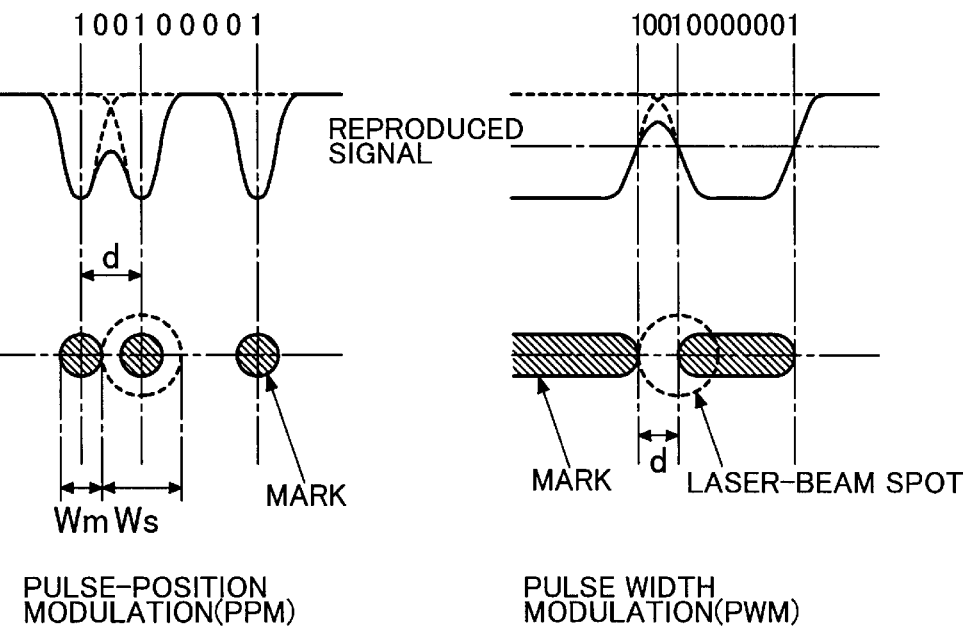
FIG. 3 is an explanatory view for a mark position recording and mark edge recording.
Figure 4:
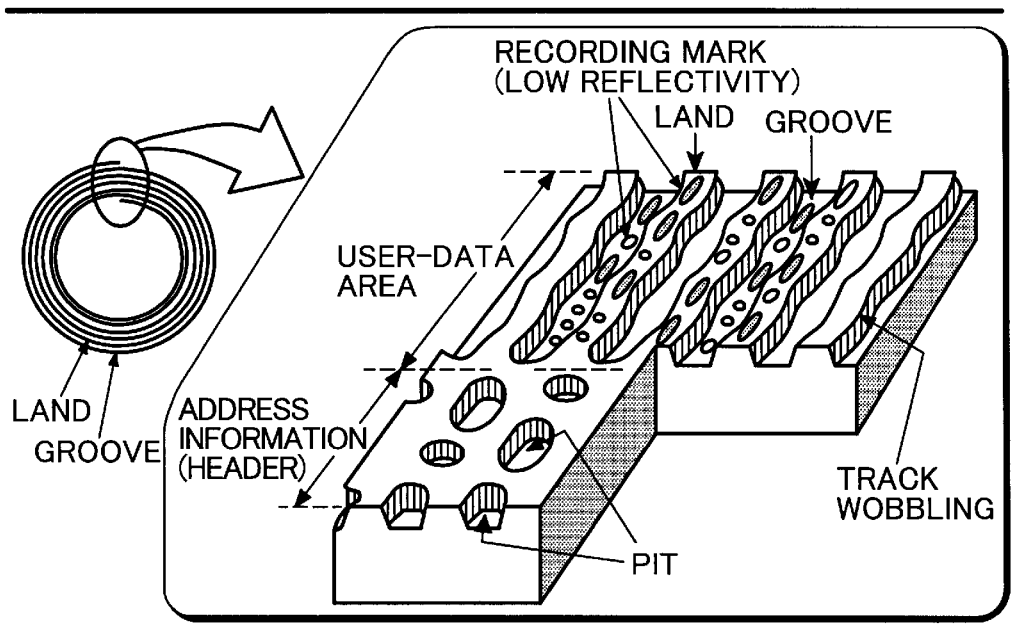
FIG. 4 is a schematic view for a format of a substrate.
Figure 5:
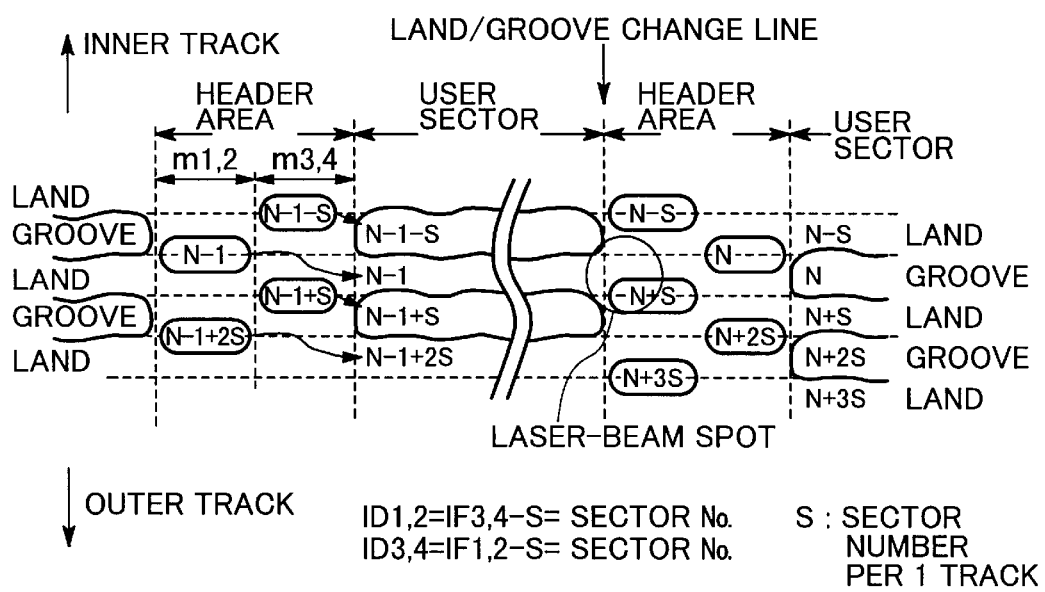
FIG. 5 is a schematic view for a header area of the format of the substrate.
Figure 6:
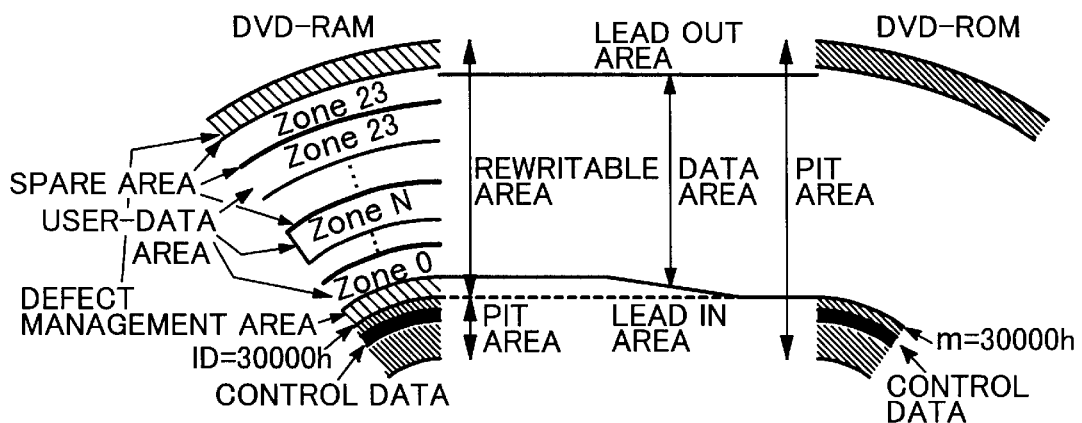
FIG. 6 is a schematic view for the zone arrangement of the format of the substrate.
Figure 7:
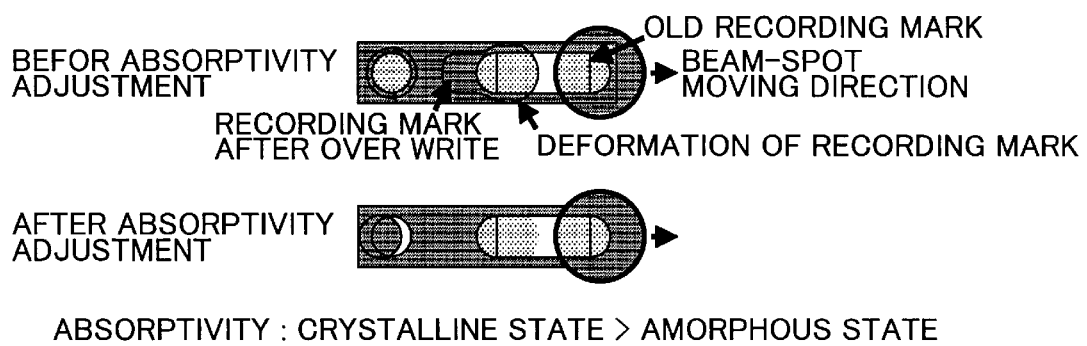
FIG. 7 is a schematic view for the effect of absorptivity adjustment.

FIG. 1 shows a cross sectional structural view of a disk shaped information recording medium as a first example according to this invention. The medium was manufactured as described below.

At first, a lower protective layer 2 comprising $(SiO_2)_{40}(ZnO)_{60}$ was formed to a thickness of 30 nm on a polycarbonate substrate 1 of 12 cm diameter and 0.6 mm thickness having, on the surface, tracking grooves with a track pitch of 0.615 μm for land/groove recording and having a pit train representing an address information at a position displaced from a track center, that is, substantially on an extension line of a boundary line between a land and a groove. Then, a lower interface layer 3 comprising a $Cr_2O_3$ film was formed to a thickness of 2 nm and, successively, a recording film 4 comprising $Ge_2Sb_2Te_5$ of 10 nm thickness, an upper interface layer comprising $Cr_2O_3$ of 5 nm thickness, an upper protective layer comprising $(SiO_2)_{20}(ZnO)_{80}$ of 30 nm thickness and a reflective layer 20 comprising Cr of 20 nm thickness were formed successively. An oxides with a Cr:oxygen ratio being slightly displaced from 2:3 and an oxide with an Si:oxygen ratio being slightly displaced from 1:2 are also referred to as $Cr_2O_3$ and $SiO_2$. Slight displacement means that within ±20% and slight displacement from 2:3 means a range from 2:2.4 to 2:3.6.

As described above, the information recording medium according to this invention is formed of stacked films comprising 6 or less layers which can be prepared by a mass production apparatus having a sputtering device with 6 or less chambers.

Further, the entire film thickness is 110 nm or less which is extremely excellent in view of the mass productivity compared with existent disks.

In this text, the compositional ratio is expressed each by atomic %. The film was formed by a magnetron sputtering apparatus. The first disk member was obtained as described above.

In the disk described above, the substrate was not substantially changed in view of the warp before and after the film deposition of the stacked films showing that no stresses occurred.

Quite in the same method, a second disk member having the constitution identical with that of the first disk member was obtained. Then, a protective coat 22 was applied with UV-light curing resin on the surface of the films for each of the first disk member and the second disk member and the respective UV-light curing resin layers were bonded to each other by way of an adhesive layer to obtain a disk-shaped information recording medium shown in FIG. 1. An overcoat substrate may also be used instead of the second disk member.

(Initial Crystallization Method)

Initial crystallization was applied to the recording film of the disk manufactured as described above as shown below. The disk was rotated at a linear velocity of a point on the track of 6 m/s, and a laser beam from a semiconductor laser (wavelength: about 810 nm) having a circular spot shape elongated in the radial direction was irradiated at a laser beam power of 600 mW through the substrate 1 to the recording film 4. Movement of the spot was displaced each by ¼ of the radial spot length of the medium. Thus, initial crystallization was conducted. The initial crystallization may be applied once but increase in the noise by the initial crystallization could be reduced slightly by repeating it twice.

(Methods of Writing, Erasing, and Reading)

The information writing/reading was conducted to the recording medium by an information writing/reading evaluation tester. The operation of the information writing/reading evaluation tester is to be explained. As a motor control method upon writing/reading, a ZCAV(Zoned Constant Linear Velocity) system of changing the number of rotation of the disk on every zones to which writing/reading is applied is adopted. The disk linear velocity is about 8.2 m/s.

When information is recorded on the disk, recording was conducted by using a so-called 8–16 modulation system of converting 8 bit information into 16 bit information. Information from the outside of the recording apparatus is transmitted as a 8 bit unit to a 8–16 modulator. Note that: in this modulation system, information is recorded at the recording mark length of 3T–14T corresponding to the 8 bit information (T represents the clock period upon information recording, which is defined as 17.1 ns). The 3T–14T digital signals converted by the 8–16 modulator are transferred to a recording waveform generation circuit then the 3T–14T signals are time-sequentially corresponded to "0" and "1" alternately. While a laser beam at an intermediate power level is irradiated in a case of "0", a high power pulse or pulse train is irradiated in a case of "1".

When a recording mark at 4T or more is formed with the amplitude of the high power pulse as being about 3T/2–T/2, a multi-pulse recording waveform is formed. In forming the waveform, laser beam irradiation with use of plural pulse trains having high power level pulses is conducted at low power level with the amplitude of about T/2 between the pulses of the pulse train while conducted at an intermediate power level for a portion between a pulse train and another pulse train where the recording mark is not formed. Note that in this case the power level is determined to: a high power level of 10 mW for forming the recording mark; an intermediate power level of 4 mW capable of erasing the recording mark; and a low power level of 4 mW lower than the intermediate power level. As described above, the low power level may be made identical with the intermediate power level or may be set to another level. Incidentally, a region on the optical disk irradiated with the laser beam at the intermediate power level changes into a crystal state (space area) and an area irradiated with a pulse train at high power level changes into an amorphous recording mark. In addition, the recording waveform generation circuit contains a multi-pulse waveform table corresponding to a system of changing a leading pulse width and a trailing pulse width of a multi-pulse waveform in accordance with the length of the space areas before and after the mark area upon forming a series of high power pulse trains for forming the mark area (adaptive recording waveform control). This generates a multi-pulse according to waveform capable of eliminating the effects due to inter-mark heat diffusion generated between the marks as much as possible. Incidentally, the reflectance of the recording medium is higher in a crystalline state and the reflectance in a region of a recorded amorphous state is lower. The recording waveform generated by the recording waveform generation circuit is transferred to a laser driving circuit and the laser driving circuit changes the output power of a semiconductor laser in an optical head based on the waveform. The optical head mounted on this recording apparatus conducted information recording by irradiating a laser beam at a wavelength of 660 nm as an energy beam for information recording.

Where mark edge recording is conducted under the conditions described above, the mark length of 3T mark as the shortest mark is about 0.42 μm and the mark length of 14T mark as the longest mark is about 1.96 μm. The recording signal contains repeating dummy data of 4T marks and 4T spaces at the beginning end and the terminal end of the information signal. The beginning end also contains VFO.

In the recording method described above, when new information is recorded by overwriting without erasing to a portion where information has already been recorded, it is rewritten with new information. That is, overwriting by a single substantially circular optical spot is possible.

Further, this recording apparatus corresponds to a system of recording information on both of groove and land (region between grooves) (so-called land•groove (L/G) recording system). In this recording apparatus, tracking to land and groove can be selected optionally by an L/G servo circuit.

Reading of the recorded information is also conducted by using the optical head. A laser beam at 1 mW is irradiated on a recording track and reflected light from the mark and the portion other than the mark is detected to obtain a reproduced signal. The amplitude of the reproduced signal is increased by a pre-amplifier circuit and converted into 8 bit information on every 16 bits by a 8–16 modulator. By the operations described above, reading of the recorded information has been completed.

(Composition and Film Thickness of Recording Film)

The same characteristics were obtained by using, instead of the recording film of this example, a recording film of a mixed composition of GeTe and $Sb_2Te_3$ such as $Ge_2Sb_2Te_5$, $Ge_7Sb_4Te_{13}$, $Ge_4Sb_2Te_7$ and $Ge_5Sb_2Te_8$ or a composition approximate to the mixed composition described above such as $Ge_{20}Sb_{24}Te_{56}$, a recording medium in which an additive element is added to the mixed composition such as $Ag_2Ge_{21}Sb_{21}Te_{56}$ or $Sn_{1.3}Ge_{2.7}Sb_2Te_7$ and a recording film of a composition approximate thereto comprising Ge—Sb—Te series as the main ingredient. Where the content of one of the constituent elements in the recording film is displaced by 5 atomic % or more from the composition described above, it resulted in a problem such that the crystallization rate was too high causing recrystallization during cooling after melting the recording film upon recording to deform the shape of the recording mark or the crystallization rate is excessively low to cause erase residue. Accordingly, the impurity element is preferably less than 5 atomic %. It is more preferably, less than 2 atomic %.

When a relation between the thickness of the recording film and the modulation degree and the absorptivity ratio after initialization was examined, the following result was obtained.

| Recording Film Thickness (nm) | Modulation degree (%) | Absorptivity ratio Ac/Aa |
| --- | --- | --- |
| 5 | 38 | 1.42 |
| 7 | 40 | 1.25 |
| 9 | 41 | 1.13 |
| 10 | 42 | 1.08 |
| 11 | 43 | 1.06 |
| 12 | 43 | 1.04 |
| 13 | 44 | 1.02 |
| 15 | 45 | 0.98 |

From the result, the thickness of the recording film is preferably 7 nm to 13 nm since 40% or more of the modulation degree can be attained and the absorptivity ratio Ac/Aa is 1 or more, and a reproduced signal jitter of 11% or less was obtained in a case of recording 3T signals. A further preferred range is 9 nm to 12 nm by which the modulation degree is 41% or more and Ac/Aa is also 1.04 or more, and a reproduced signal jitter of 10% or less was obtained after overwriting for 10 cycles.

When the film thickness is excessively thin, since crystal nuclei formation during erasing is insufficient, and contrast is lowered in a disk with a thin lower protective layer and the reproduced signal intensity is also lowered, the reproduced signal jitter exceeds an allowable range. When the thickness of the recording film is excessively large as 15 nm or more, since the recrystallization region becomes too broad, jitter exceeds 12% after ten cycles of overwriting.

(Composition and Thickness of the Interface Layer)

$Cr_2O_3$ in the upper interface layer and the lower interface layer has an effect of preventing ZnS from diffusing into the recording film and improving the crystallization rate. Further it has advantages that the film can be prepared in an atmospheric gas only composed of Ar and adhesion with a layer is excellent. Assuming that instead of $Cr_2O_3$ or as a dual layer constitution with the $Cr_2O_3$ layer, nitrides are used such as Ge—Cr—N series materials, Si—Cr—N series materials or Ge—Si—Cr—N series materials containing 30 atomic % to 60 atomic % of Ge or Si, 5 atomic % to 20 atomic % of Cr having a composition, for example, $Ge_{50}Cr_{10}N_{40}$, or Ti—N series materials such as $Ti_{60}N_{40}$, Ta—N series materials such as $Ta_{55}N_{45}$ and Sn—N series materials such as $Sn_{70}N_{30}$. In that case, the effect of improving the crystallization rate is great, but the rewritable cycles is reduced by 10 to 20%. When the linear velocity is 10 m/s or less, Sn oxides such as $SnO_2$ may also be used with no troubles in view of the crystallization rate of the recording film. Sn—O—N may also be used. Since the thermal conductivity of the Sn-containing materials is relatively low, a single layer structure is also possible by serving it both as the interface layer and the protective layer. It is particularly preferred to adopt a single layer constitution for the upper protective layer and the upper interface layer. Particularly, when an oxide or nitride of Cr and Ge is contained by 60 mol % or more, the storage life is improved and high performance can be maintained even put in a high temperature and high humidity circumstance. Further, since the Ge-containing composition such as GeN or GeO has higher sputtering rate upon film preparation, the tact time during manufacture can be shortened preferably. However, the material cost is relatively expensive.

As the material for the interface layer disposed between the recording film and the protective film, $Cr_2O_3$, Cr—N, Ge—N, Sn—N, Ge—O or a mixture of them is preferred. Among them, $Cr_2O_3$ and Cr—N are more preferred since the fluctuation of the reflectance level can be kept to 5% or lower and the jitter can be reduced upon multi-time rewriting. $Cr_2O_3$ has a further advantage of inexpensive material cost. Sn—N is more preferred since it has a merit of less linear velocity density, can provide an erase ratio of 25 dB or more in a range of the linear velocity of 8 m/s to 16 m/s, and increase of the jitter after overwriting at 12 m/s to 16 m/s to 4% or less. Further, the Sn compound such as Sn—N has a favorable crystallization characteristic in which the ratio of N to Sn is more preferably 0.1 to 0.4 and if N is 40 atomic % or less, no degradation of the crystallization characteristic was observed even when O, Se or Te is mixed together. When S is mixed, the crystallization characteristic was deteriorated. When the amount of the elements mixed is 70 atomic % or less even when they exceeds 40 atomic %, there was no problem unless recording is conducted at high linear velocity of 10 m/s or more, although the crystallization rate is somewhat lowered. O is most preferred among O, Se, Te and it has an effect of preventing change of the reflectance and lowering of the crystallization rate by the diffusion of Sn into the recording film upon multi-time rewriting. Prevention effect of the diffusion was observed at 20 atomic % or more.

Next, $SiO_2$, $Al_2O_3$, $Ta_2O_5$, a mixture of $Ta_2O_5$ with $Cr_2O_3$ or Cr—N, Ge—N or Ge—O is preferred and then $ZrO_2$, $Y_2O_3$, $Cr_2O_3$ or a mixture with Cr—N, Ge—N or $Ta_2O_5$ is preferred. CoO, $Cr_2O$ and NiO is more preferred since the crystal grain size upon initial crystallization is uniform and increase of jitter upon initial stage of rewriting is small. Further, nitrides such as AlN, BN, CrN, $Cr_2N$, GeN, HfN, $Si_3N_4$, Al—Si—N series materials (for example, $AlSiN_2$), Si—N series materials, Si—O—N series materials, TaN, TiN and ZrN are more preferred since the adhesion is increased and the deterioration of the information recording medium by external impact is small.

The interface layer has an effect of preventing undesired effects that ZnS diffuses into the recording film by multi-time overwriting, at the film thickness of 1 nm or more. The film thickness is preferably 3 nm or more in order to obtain a sufficient effect of improving the crystallization rate. However, in a case of the lower interface layer, when the film thickness of $Cr_2O_3$ exceeds 2 nm, it causes a problem of lowering the reflectance by the light absorption of this layer. In the case of the lower interface layer, the film thickness of $Cr_2O_3$ is preferably 5 nm or less in view of light absorption but the thickness may be somewhat increased, for example, as 7 nm in order to establish balance of heat diffusion between upward and downward direction. For example, an interface layer such as made of Ge—Cr—N showing lower absorption than that of $Cr_2O_3$ showed no trouble even by a more increased thickness.

However, since the sputtering rate of the material for the interface layer is low, it is preferably 20 nm and, more preferably 10 nm or less in view of the productivity.

From the foregoings, the thickness of the upper interface layer is preferably 3 nm to 20 nm and, more preferably, 3 nm to 10 nm. The thickness of the lower interface layer is 3 nm to 8 nm.

Where the protective layer in adjacent with the interface layer is made of an oxide or a nitride, since the protection layer has an effect of improving the crystallization rate, the interface layer is used for improving the adhesion.

As described above, in a case where the lower protective layer is made of oxide, oxynitride or nitride the thickness of the lower interface layer is preferably 1 nm to 2 nm.

In addition, Ti and oxide thereof are also preferred as the material instead of $Zr_2O_3$ for the upper interface layer and the lower interface layer.

It is possible to serve the upper interface layer also as the upper protective layer to decrease the number of layers by one to reduce the manufacturing cost. In this case, since diffusion of ZnS into the recording film is caused, the crystallization rate was lowered after 200 cycles of rewriting.

There is an advantageous effect in which crystallization rate was not lowered even after 500 cycles of rewriting in the upper interface layer even if the layer serves as the upper protective layer at the same time, the layer comprising following materials: Sn—O— or Sn—O—N material such as $SnO_2$; Sn—Si—O, Sn—Si—N or Sn—Si—O—N material such as $SnO_2$—$SiO_2$, $SnO_2$—$Si_3N_4$ and $SnO_2$—$SiO_2$—$Si_3N_4$; Sn—Al—O, Sn—Al—N or Sn—Al—O—N material such as $SnO_2$—$Al_2O_3$, $SnO_2$—AlN, $SnO_2$—$Al_2O_3$—AlN; Sn—Cr—O, Sn—Cr—N or Sn—Cr—O—N material such as $SnO_2$—$Cr_2O_3$, $SnO_2$—CrN or $SnO_2$—$Cr_2O_3$—CrN; Sn—Mn—O, Sn—Mn—N or Sn—Mn—O—N material such as $SiO_2$—$Mn_3O_4$, $SnO_2$—$Mn_5N_2$ or $SnO_2$—$Mn_3O_4$—$Mn_5N_2$; Sn—Ta—O, Sn—Ta—N or Sn—Ta—O—N material such as $SnO_2$—$Ta_2O_5$, $SnO_2$—$Ta_2N$ or $Sn_2O$—$Ta_2O_5$—$Ta_2N$; Sn—Ge—O, Sn—Ge—N or Sn—Ge—O—N material such as $SnO_2$—$GeO_2$, $SnO_2$—$Ge_3N_4$ or $SnO_2$—$GeO_2$—$Ge_3N_4$; Sn—Ti—O, Sn—Ti—N or Sn—Ti—O—N material such as $SnO_2$—$TiO_2$, $SnO_2$—$Ti_2N$, $SnO_2$—$TiO_2$—$Ti_2N$; Sn—Mo—O, Sn—Mo—N or Sn—Mo—O—N material such as $SnO_2$—$MoO_3$, $SnO_2$—$Mo_2N$—MoN or $SnO_2$—$MoO_2$—$Mo_2N$—MoN; Sn—Zr—O, Sn—Zr—N or Sn—Zr—O—N material such as $SnO_2$—$ZrO_2$, $SnO_2$—ZrN or $SnO_2$—$ZrO_2$—ZrN; Sn—Co—O, Sn—Co—N or Sn—Co—O—N material such as $SnO_2$—$Co_2O_3$, $SnO_2$—$Co_2N$ or $SnO_2$—$Co_2O_3$—$Co_2N$; Sn—In—O, Sn—In—N or Sn—In—O—N material such as $SnO_2$—$In_2O_3$, $SnO_2$—In—N or $SnO_2$—$In_2O_3$—N; Sn—Zn—O, Sn—Zn—N or Sn—Zn—O—N material such as $SnO_2$—ZnO, $SnO_2$—Zn—N or $SnO_2$—ZnO—Zn—N; Sn—Gd—O, Sn—Gd—N or Sn—Gd—O—N material such as $SnO_2$—$Gd_2O_3$, $SnO_2$—$Gd_2N$ or $SnO_2$—$Gd_2O_3$—$Gd_2N$; Sn—Bi—O, Sn—Bi—N or Sn—Bi—O—N material such as $SnO_2$—$Bi_2O_3$, $SnO_2$—Bi—N or $SnO_2$—$Bi_2O_3$—Bi—N; Sn—Ni—O, Sn—Ni—N or Sn—Ni—O—N material such as $SnO_2$—$Ni_2O_3$, $SnO_2$—Ni—N or $SnO_2$—$Ni_2O_3$—Ni—N; Sn—Nb—O, Sn—Nb—N or Sn—Nb—O—N material such as $SnO_2$—$Nb_2O_3$, $SnO_2$—NbN or $SnO_2$—$Nb_2O_3$—NbN; Sn—Nd—O, Sn—Nd—N or Sn—Nd—O—N material such as $SnO_2$—$Nd_2O_3$, $SnO_2$—NdN or $SnO_2$—$Nd_2O_3$—NdN; Sn—V—O, Sn—V—N or Sn—V—O—N material such as $SnO_2$—$V_2O_3$, $SnO_2$—VN or $SnO_2$—$V_2O_3$—VN; or a mixture of the materials such as Sn—Cr—Si—O—N material, Sn—Al—Si—O—N material or Sn—Cr—Co—O—N material.

Among them, Sn—O or Sn—O—N material were more preferred since the film forming rate is extremely high as about twice of the existent material $(ZnS)_{80}(SiO_2)_{20}$ and, accordingly, are suitable to mass production. Further, when the Sn—O or Sn—O—N material in the mixed material is 70 mol % or more and of the entire material and the Cr—O or Cr—O—N material in the mixed material is 70 mol % or more of the entire material, the film forming rate is as high as about 1.5 times the $(ZnS)_{80}(SiO_2)_{20}$ and the thermal stability is more preferred compared with Sn—O or Sn—O—N material to cause less degradation in erasing ratio during rewriting. The same effect was also observed when Mn—O or Mn—O—N was used instead of the Cr—O and Cr—O—N material. Also, Sn—Gd—O, Sn—Gd—N or Sn—Gd—O—N material, Sn—Bi—O, Sn—Bi—N or Sn—Bi—O—N material, and Sn—Zr—O, Sn—Zr—N or Sn—Zr—O—N material is highly stable but the sputtering rate was low by about 10% compared with Sn—Cr—O, Sn—Cr—O—N, Sn—Mn—O and Sn—Mn—O—N. Further, when the Sn—Ge—O, Sn—Ge—N or Sn—Ge—O—N material is used, adhesion with the recording film was increased and the storage life was improved. The same effect could also be obtained by using the Sn—Mo—O, Sn—Mo—O—N material instead of the Sn—Ge—O, Sn—Ge—N or Sn—Ge—O—N material.

On the other hand, the Sn—In—O, Sn—In—N or Sn—In—O—N material has a merit that the electric resistance is low and DC sputtering is possible. When In is more than Sn, the sputtering rate can be improved by twice or more but change of the reflectance is caused by 500 cycles or more of rewriting. Also the Sn—Zn—O, Sn—Zn—N or Sn—Zn—O—N material can be DC sputtered.

Since the Ge—Cr—N series material, Si—Cr—N series material or Ge—Si—Cr—N series material containing 30 atomic % to 60 atomic % of Ge or Si and 5 atomic % to 20 atomic % of Cr having a composition, for example, $Ge_{50}Cr_{10}N_{40}$, or the material comprising Zn and O as the main ingredient (70 atomic % or more in total) can lower the heat diffusion rate, the lowering of the recording sensitivity is also small.

When the impurity element is 5 atomic % or more relative to the interface layer constituting elements, since the crystallization rate is lowered and the increase of jitter increases during overwriting, the impurity element is preferably less than 5 atomic % and, preferably, less than 2 atomic %.

Since the materials for the interface layer described above have low electric resistance of the target and DC sputtering is possible, short tact time can be obtained and had effects capable of obtaining favorable phase change characteristic and multi-time rewriting characteristic when they are used not only for the film constitution of this invention but also as the protective layer or the interface layer in a recording medium with the thickness of the lower protective layer exceeding 60 nm, as the protective layer, the interface layer or the interface layer also serving as the protective layer of a recording medium having different recording film composition, or the protective layer, the interface layer or the interface layer also serving as the protective layer of a recording medium of different film constitution. The materials include Sn—O— or Sn—O—N material such as $SnO_2$; Sn—Si—O, Sn—Si—N or Sn—Si—O—N material such as $SnO_2$—$SiO_2$, $SnO_2$—$Si_3N_4$ or $SnO_2$—$SiO_2$—$Si_3N_4$; Sn—Al—O, Sn—Al—N or Sn—Al—O—N material such as $SnO_2$—$Al_2O_3$, $SnO_2$—AlN, $SnO_2$—$Al_2O_3$—AlN; Sn—Cr—O, Sn—Cr—N or Sn—Cr—O—N material such as $SnO_2$—$Cr_2O_3$, $SnO_2$—CrN or $SnO_2$—$Cr_2O_3$—CrN; Sn—Mn—O, Sn—Mn—N or Sn—Mn—O—N material such as $SnO_2$—$Mn_3O_4$, $SnO_2$—$Mn_5N_2$ or $SnO_2$—$Mn_3O_4$—$Mn_5N_2$; Sn—Ta—O, Sn—Ta—N or Sn—Ta—O—N material such as $SnO_2$—$Ta_2O_5$, $SnO_2$—$Ta_2N$ or $SnO_2$—$Ta_2O_5$—$Ta_2N$; Sn—Ge—O, Sn—Ge—N or Sn—Ge—O—N material such as $SnO_2$—$GeO_2$, $SnO_2$—$Ge_3N_4$, $SnO_2$—$GeO_2$—$Ge_3N_4$; Sn—Ti—O, Sn—Ti—N or Sn—Ti—O—N material such as $SnO_2$—$TiO_2$, $SnO_2$—$Ti_2N$, $SnO_2$—$TiO_2$—$Ti_2N$; Sn—Mo—O, Sn—Mo—N or Sn—Mo—O—N material such as $SnO_2$—$MoO_3$, $SnO_2$—$Mo_2N$—MoN or $SnO_2$—$MoO_2$—$Mo_2N$—MoN; Sn—Zr—O, Sn—Zr—N or Sn—Zr—O—N material such as $SnO_2$—$ZrO_2$, $SnO_2$—ZrN or $SnO_2$—$ZrO_2$—ZrN; Sn—Co—O, Sn—Co—N or Sn—Co—O—N material such as $SnO_2$—$Co_2O_3$, $SnO_2$—$Co_2N$ or $SnO_2$—$Co_2O_3$—$Co_2N$; Sn—In—O, Sn—In—N or Sn—In—O—N material such as $SnO_2$—$In_2O_3$, $SnO_2$—In—N or $SnO_2$—$In_2O_3$—N; Sn—Zn—O, Sn—Zn—N or Sn—Zn—O—N material such as $SnO_2$—ZnO, $SnO_2$—Zn—N or $SnO_2$—ZnO—Zn—N; Sn—Gd—O, Sn—Gd—N or Sn—Gd—O—N material such as $SnO_2$—$Gd_2O_3$, $SnO_2$—$Gd_2N$ or $SnO_2$—$Gd_2O_3$—$Gd_2N$; Sn—Bi—O, Sn—Bi—N or Sn—Bi—O—N material such as $SnO_2$—$Bi_2O_3$, $SnO_2$—$Bi_2N$ or $SnO_2$—$Bi_2O_3$—$Bi_2N$; Sn—Ni—O, Sn—Ni—N or Sn—Ni—O—N material such as $SnO_2$—$Ni_2O_3$, $SnO_2$—$Ni_2N$ or $SnO_2$—$Ni_2O_3$—$Ni_2N$; Sn—Nb—O, Sn—Nb—N or Sn—Nb—O—N material such as $SnO_2$—$Nb_2O_3$, $SnO_2$—$Nb_2N$ or $SnO_2$—$Nb_2O_3$—$Nb_2N$; Sn—Nd—O, Sn—Nd—N or Sn—Nd—O—N material such as $SnO_2$—$Nd_2O_3$, $SnO_2$—$Nd_2N$ or $SnO_2$—$Nd_2O_3$—$Nd_2N$; Sn—V—O, Sn—V—N or Sn—V—O—N material such as $SnO_2$—$V_2O_3$, $SnO_2$—$V_2N$ or $SnO_2$—$V_2O_3$—$V_2N$; or mixture of the materials described above such as Sn—Cr—Si—O—N material, Sn—Al—Si—O—N material, or Sn—Cr—Co—O—N material, that is, those materials containing at least Sn and oxygen or nitrogen. Particularly, an excellent effect was obtained by the recording medium having the constitution with the number of layers of 7 or less and/or used at a linear velocity of 10 m/s or more.

(Composition and Thickness of the Reflective Layer)

For adjusting the absorptivity ratio and keeping a high contrast, the reflective layer uses Cr, Al, In, Ni, Mo, Pt, Pd, Ti, W, Ge, Sb or Bi and an alloy or a compound containing one of them. The content of the element in the alloy or the compound is preferably 50 atomic % or more. The layer can properly absorb light and properly transmit light by which the light transmitting the recording film at a recording mark area of low reflectance is reflected on the reflective layer and absorbed again in the recording layer to prevent excess elevation of the temperature and adjust Ac/Aa to 1 or more. For adjusting the heat diffusion, formation of an alloy with at least one of Au, Ag, Cu and Al has an effect of improving the quality of the reproduced signals.

In the high density phase change optical disk, since the track pitch is narrow, it is necessary to take a consideration on the phenomenon referred to as cross erase in which a portion of the recording mark already written in the adjacent tracks is erased. In order to prevent cross erase, the vertical diffusion of heat described above is important. Suppression of heat from going to the adjacent tracks by the vertical diffusion is one of the reasons. If Ac/Aa is greater than 1, it decreases the temperature elevation in the recording mark area of adjacent tracks and exerts a preferred effect also in view of prevention of cross erase.

Figure 8:
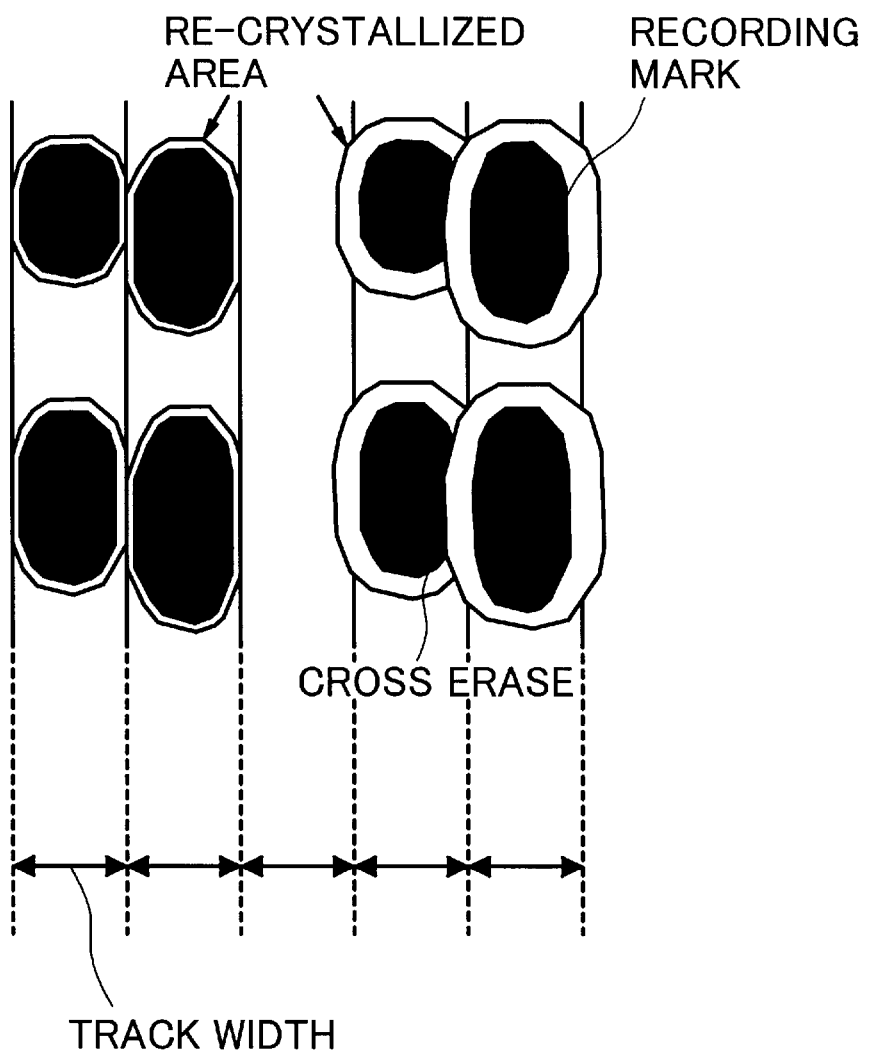
FIG. 8 is a schematic view for a recording film recrystallization region.
Figure 9:
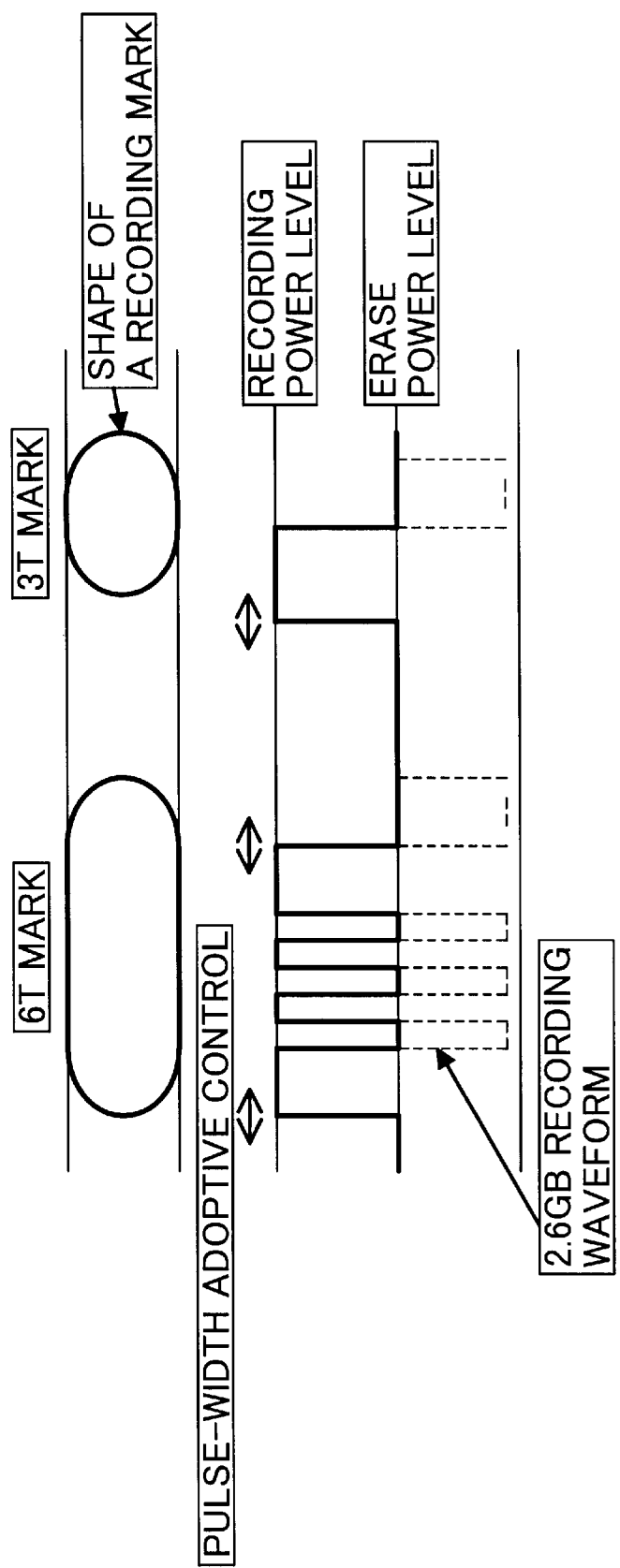
FIG. 9 is a schematic view for a relation between the adaptive control of a recording waveform and a mark length.

Prevention of recrystallization is also important for the prevention of cross erase. As shown in FIG. 8, in a case where the area remaining as an amorphous recording mark by recrystallization from the periphery after the melting of the recording film upon recording is narrowed, since it is necessary to melt a more wide area for forming a recording mark of a predetermined size and the temperature of the adjacent track tends to be increased. When heat is diffused in the vertical direction, recrystallization can also be prevented. This is because heat in the central area diffuses laterally upon recording mark formation to retard cooling at the periphery of the melting area and can prevent the tendency of crystallization.

Materials used preferably for the reflective layer are, Cr, Cr—Al, Cr—Ag, Cr—Au, Cr—Ge, Cr-Ti or those comprising Cr or Cr alloy as a main ingredient and, next to them, those comprising Al alloy such as Al—Ti, Al—Cr or Al—In as a main ingredient, as well as Ge—Cr, Ge—Si and Ge—N. In addition, those comprising Co, Ni, Mo, Pt, W, Ge, Sb, Bi, Ag, Au or Cu as a main ingredient may also be used.

When the content of the element other than Cr is within a range of 0.5 atomic % to 20 atomic %, characteristic upon multi-time rewriting and bit error rate were improved, which are more improved within a range of 1 atomic % to 10 atomic %. When oxygen (O) is added by 20 atomic % or less in Cr, film peeling is preferably suppressed. Addition of Ti provides the same effect.

When the content of the element other than Al is within a range of 3 atomic % to 20 atomic %, characteristic upon multi-time rewriting and bit error rate were improved, which are more improved within a range of 5 atomic % to 15 atomic %.

When the content of the element other than Ge is within a range of 0 atomic % to 80 atomic %, characteristic upon multi-time rewriting and bit error rate were improved, which are more improved within a range of 2 atomic % to 50 atomic %.

Further, those materials having n, k within a range from 2.0 to 5.0 with k being −3.0 to −5.5 are particularly preferred since a large contrast ratio can be obtained at an appropriate thickness of the upper protective layer and the absorptivity ratio Ac/Aa between the absorptivity ratio Ac in the crystalline state and the absorptivity ratio Aa in the amorphous state of the recording film can be 1 or more. Further, the target is inexpensive, has an appropriate thermal conductivity and favorable rewriting characteristics.

Those comprising Ag alloys such as Ag—Pd, Ag—Cr, Ag—Ti, Ag—Pt, Ag—Cu or Ag—Pd—Cu as a main ingredient and, next to them those comprising Au alloys such as Au—Cr, Au—Ti, Au—Ag, Au—Cu and Au—Nd as a main ingredient, and those comprising Cu alloys as a main ingredient provide high reflectance and favorable reproducing characteristics. However, since Pt and Au are noble metals, they are expensive and increase cost compared with Cr, Al, Co, Ni, Mo, Ag, W, Ge, Sb and Bi.

When the impurity element is 10 atomic % or more based on the elements constituting the reflective layer, the thermal conductivity is lowered and the increase of jitter is increased during multi-time rewriting, so that the impurity element is preferably less than 10 atomic %, more preferably, less than 5 atomic %.

When a relation between the thickness of the reflective layer, and the reflectance, the modulation degree and the absorptivity ratio Ac/Aa after initialization was examined, the following result was obtained.

| Recording Film Thickness (nm) | Modulation degree (%) | Ac/Aa |
|---|---|---|
| 5 | 38 | 1.2 |
| 10 | 40 | 1.15 |
| 15 | 41 | 1.1 |

-continued

| Recording Film Thickness (nm) | Modulation degree (%) | Ac/Aa |
|---|---|---|
| 23 | 42 | 1.06 |
| 40 | 42 | 1.05 |
| 60 | 44 | 0.99 |
| 80 | 45 | 0.90 |

From the result, the thickness of the reflective layer is preferably 10 nm to 60 nm. When the thickness is reduced excessively, the modulation degree is decreased and, in addition, jitter increases during multi-time rewriting since cooling is not conducted sufficiently. Further, when the thickness is too large, the absorptivity ratio is small and jitter increases during overwriting, as well as this causes stress deformation of groove in the substrate. Accordingly, it is more preferably 15 nm to 40 nm.

(Composition and Thickness of the Lower Protective Layer)

The materials that can be used as lower protective layer are: oxides such as $ZnS—SiO_2$, $ZnS—Al_2O_3$, $ZnS—Ta_2O_5$, $ZnS—SnO_2$, $ZnS—In_2O_3$, $ZnS—TiO_2$, $ZnS—Cr_2O_3$, $ZnS—ZnO$, or $ZnO$, $SiO_2$, $Al_2O_3$, $Ta_2O_5$, $SnO_2$, $In_2O_3$, $TiO_2$, $SnO_2—In_2O_3$, $Cr_2O_3$, $ZnO—SiO_2$, $Al_2O_3—SiO_2$, $Ta_2O_5—SiO_2$, $SnO_2—SiO_2$, $In_2O_3—SiO_2$, $TiO_2—SiO_2$, $SnO_2—In_2O_3—SiO_2$, $Cr_2O_3—SiO_2$, $ZnO—Al_2O_3$, $Ta_2O_5—Al_2O_3$, $SnO_2—Al_2O_3$, $In_2O_3—Al_2O_3$, $TiO_2—Al_2O_3$, $SnO_2—In_2O_3—Al_2O_3$ and $Cr_2O_3—Al_2O_3$ or mixtures of the material described above or those materials described above which are partially or entirely substituted with nitrides. Setting the thermal conductivity of the layer higher than that of the upper protective layer, since the heat diffusion in the vertical direction from the recording film increases the symmetricity that can increases the symmetricity for the characteristics between land and the groove, effectively prevents cross erase liable to occur particularly in the groove. Therefore, it is preferred that the material for the lower protective layer has a content of oxide, nitride or oxynitride of 50 mol % or more.

Among the materials described above, those materials containing $In_2O_3$ or $SnO_2$ are particularly preferred since the electric resistance of the target is low, DC sputtering is possible and short tact time can be attained. Also the material containing ZnO, DC sputtering is possible when the ZnO content is 50 mol % or less. The conductive lower protective layer material is preferred to existent $ZnS—SiO_2$ when it is used in a case where the thickness of the lower protective film exceeds 60 nm, for example, 100 nm.

Where the thickness of the protective layer is extremely thin, for example, at 5 nm, groove deformation occurs which develops as reading error of address signals or lowering of the amount of reflected light when a number of tracks 100 tracks or more, for example, entire 1 zone are overwritten by multi-cycles, and this is considered to be attributable to the expansion on the surface of the substrate and extension of inter-molecule distance by the elevation of temperature under the irradiation of the laser beam at a recording power level. Accordingly, when the oxide in the material for the lower protective layer is 50 mol % or more based on the entire material, the thermal conductivity is increased to prevent heat from conducting to the substrate and it increases the hardness to suppress the groove deformation preferably.

Further, among the materials, $ZnO$ or $In_2O_3$, $SnO_2$ and $SnO_2—In_2O_3$ were preferred since they can increase the sputtering rate and in view of the mass productivity. $ZnO—SiO_2$ or $SnO_2—In_2O_3—SiO_2$ had the sputtering rate somewhat lower than that described above but could improve the contrast by 3% compared with that described above. Then, $SiO_2$ and $TiO_2$ were also preferred since they could increase the sputtering rate. $In_2O_3$—$SnO_2$ having a composition at or near $(In_2O_3)_{83}(SnO_2)_{17}$ is preferred since the target is inexpensive and the sputtering rate is high.

Further, Ge—Cr—N series material such as $Ge_{50}Cr_{10}N_{40}$ or Si—Cr—N series material such as $Si_{50}Cr_{10}N_{40}$ may also be used but the productivity is somewhat worsened since the sputtering rate is somewhat lower.

When the impurity element is 10 atomic % or more based on the elements constituting the lower protective layer, since the contrast is lowered and the jitter increases, the impurity element is preferably less than 10 atomic % and, more preferably, less than 5 atomic %.

A preferred thickness of the lower protective layer is within a range from 20 nm to 60 nm in order to obtain sufficient increase in the recording sensitivity due to interference of light and contrast ratio between the crystalline state and the amorphous state, as well as to suppress the amount of deformation of the groove in the substrate. The range for the thickness is preferred since it can suppress the deformation of the substrate after multi-time rewriting or 500 cycles of more.

For suppressing the groove deformation of the substrate, it is necessary to restrict the thickness of the lower protective layer so as not to elevate the temperature of the substrate upon film preparation. Then, a lower reflective layer of 20 nm to 60 nm is disposed. The refractive index n is preferably 1.6 to 1.9 so as to enhance the optical contrast. The extinction coefficient k is preferably as close as 0. This is because the contrast is lowered if k is larger. Further, since the thermal conductivity of the layer is higher by one digit or more than that of the recording film, the symmetricity of heat diffusion from the recording film in the vertical direction is increased, so that it also provides an effect of increasing the symmetricity for the characteristic of the land and groove and, particularly, preventing cross erase tending to occur in the groove. Examples of such a material can include, for example, a mixed $SiO_2$—$In_2O_3$ material such as $(SiO_2)_{70}(In_2O_3)_{30}$, a mixed $SiO_2$—$SnO_2$ material such as $(SiO_2)_{50}(SnO_2)_{50}$, mixed $SiO_2$—$ZnO$ material such as $(SiO_2)_{50}(ZnO)_{50}$, or mixtures formed by mixing two or more of them or those partially nitriding them. However, if the thermal conductivity of the layer is excessively high, cross erase for the land increases.

When the thickness of the recording film is reduced, the reflectance is also lowered and this is compensated by the reflectance improving film. However, if the thickness of the recording layer is further reduced, this decreases the difference of the reflectance between the crystalline state and the amorphous state and, accordingly, decreases the reproduced signal intensity itself, so that it can not be reduced further.

Since deformation of the substrate occurs during multi-time rewriting for more than 500 cycles when the layer is less than 20 nm, the thickness is preferably 20 nm or more in order to prevent this.

(Composition and Thickness of the Upper Protective Layer)

The material that can be used for the upper protective layer includes in addition to the material that can serve also as the upper interface layer described previously, those oxides such as ZnS—$SiO_2$, ZnS—$Al_2O_3$, ZnS—$Ta_2O_5$, ZnS—$SnO_2$, ZnS—$In_2O_3$, ZnS—$TiO_2$, ZnS—$Cr_2O_3$, ZnS—ZnO or ZnO, $SiO_2$, $Al_2O_3$, $Ta_2O_5$, $SnO_2$, $In_2O_3$, $TiO_2$, $SnO_2$—$In_2O_3$, $Cr_2O_3$, ZnO—$SiO_2$, $Al_2O_3$—$SiO_2$, $Ta_2O_5$—$SiO_2$, $SnO_2$—$SiO_2$, $In_2O_3$—$SiO_2$, $TiO_2$—$SiO_2$, $SnO_2$—$In_2O_3$—$SiO_2$, $Cr_2O_3$—$SiO_2$, ZnO—$Al_2O_3$, $Ta_2O_5$—$Al_2O_3$, $SnO_2$—$Al_2O_3$, $In_2O_3$—$Al_2O_3$, $TiO_2$—$Al_2O_3$, $SnO_2$—$In_2O_3$—$Al_2O_3$ and $Cr_2O_3$—$Al_2O_3$ or a mixture of the material described above or those materials described above which are partially or entirely substituted with nitrides.

When the thermal conductivity of the upper protective layer is too high, heat diffuses laterally during recording tending to cause cross erase, so that the compositional ratio of ZnS and the mixed material having large thermal conductivity ($SiO_2$, $Al_2O_3$, $Cr_2O_3$, $Ta_2O_5$) preferably comprises 60 mol % to 90 mol % of ZnS. Where the material with lower thermal conductivity than $SiO_2$ ($In_2O_3$—$SnO_2$, $In_2O_3$, $TiO_2$, ZnO, $SnO_2$) and ZnS are mixed, ZnS was preferably 50 mol % to 85 mol %. When the thermal conductivity is excessively high out of the range described above, jitter increase by cross erase is 3% or more. Further, while Ge—Cr—N series material such as $Ge_{50}Cr_{10}N_{40}$ or Si—Cr—N series material such as $Si_{50}Cr_{10}N_{40}$ can be used instead of the oxide of high thermal conductivity such as $SiO_2$, since the sputtering rate is somewhat lower, the productivity is worsened somewhat.

When the impurity element is 10 atomic % or more based on the elements constituting the upper protective layer, since the contrast is lowered and the jitter increases, the impurity element is preferably less than 10 atomic % and, more preferably, less than 5 atomic %.

When the relation between the thickness of the upper protective layer and the increase of jitter by cross erase and reflectance after initialization was examined, it was as shown below.

| Upper protective layer (nm) | Jitter increase to cross erase (%) | Reflectance after initialization (%) |
| --- | --- | --- |
| 20 | 5 | 25 |
| 25 | 2 | 22 |
| 28 | 1.0 | 21 |
| 30 | 1.0 | 20 |
| 35 | 0.8 | 19 |
| 40 | 0.5 | 17 |
| 45 | 0.5 | 15 |
| 50 | 0.4 | 13 |

From the result described above, since it is necessary that the jitter increase due to cross erase is less than 3% and the reflectance is 15% or more for attaining a practical level of the overwrite characteristic, a preferred thickness of the upper protective layer is within a range from 25 nm to 45 nm and, more preferably, within a range from 28 nm to 40 nm. From an optical point of view, the same conditions are obtained also for the increased thickness at a period of ½ for the value obtained by dividing the wavelength with the refractive index but deformation or crack of the substrate occurs by the stress of the film and it takes a longer film preparation time disadvantageously.

In view of the above, satisfactory result could be obtained also in the six layered structure comprising $SiO_2$—$In_2O_3$ lower protective layer/$Cr_2O_3$ lower interface layer/recording film/$Cr_2O_3$ upper interface layer/$SnO_2$ upper protective layer/Cr—Ag reflective layer.

(Substrate)

Ina the example, a polycarbonate substrate 1 having tracking grooves directly formed on the surface is used. The substrate having tracking grooves is a substrate having grooves each at a depth of λ/10n' (where n' represents the refractive index of the substrate material) or more entirely or partially in the surface of the substrate. The groove may be formed continuously for the entire circumference or may be divided. It has been found that cross talk decreases preferably at the groove depth of about λ/6n. The groove width may be different depending on the location. When it is narrower toward the inner circumference, problem upon multi-time rewriting less occurs. Either a substrate having a format capable of writing/reading in both of the directions of the groove and the land, or a substrate having a format for conducting recording in either one direction may be used. When a UV-light curing resin is coated to a thickness of about 10 μm on reflective layers of the first and the second disk members before bonding and they are bonded after curing, the error rate can be lowered further. In this example, two disk members are prepared and the first and the second disk members are bonded to each other on the side of the reflective layers 7. It is preferred to change the material for the substrate from the polycarbonate to the material comprising polyolefin as the main ingredient, since the hardness of the surface of the substrate increases and the amount of thermal deformation of the substrate is reduced by about 10%. However the material cost was increased by twice or more.

(Method of Measuring Radial Tilt Amount)

The method of measuring the radial tilt amount (r-tilt) is to be explained. In this text, only the case of measuring the radial tilt amount in the groove is explained specifically as an example.

At first, a disk to be measured is set to an evaluation tester and rotated. Then, an optical head is moved to the vicinity of the track for which the radial tilt amount is measured. Auto-focusing is applied at that place and tracking error signals (differential signal) are monitored by an oscilloscope. Then, the gain for the auto-focusing is controlled such that the amplitude of the tracking error signal in the groove is maximized (AF offset control). Then, tracking is applied to the groove in a state of applying auto-focusing. Then, recording is conducted while changing the laser power by a random signals and a recording power at which the displacement of the center line for an envelope of signals corresponding to 3T (shortest) mark and space from the center line for an envelope of signals corresponding to longer mark and space (asymmetry) is +5% (5% on the side of the amorphous level) is determined to define it as an optimal recording power. Then, a relation between the radial tilt and the jitter value after 10 cycles of overwriting (optimal power) is measured by a time interval analyzer (TIA), to determine the radial tilt that minimizes the jitter. That is, while changing the radial tilt, current jitter is measured to determine the radial tilt that minimizes the jitter.

In the same manner, radial tilt in the land is determined and the amount of tilt that minimizes the average jitter for the land and the groove is defined as a radial tilt amount (r-tilt).

(Method of Measuring the Stress Deformation Amount of Groove)

A method of measuring the stress deformation amount of groove is to be explained. As an example, only the case of measuring the stress deformation amount of groove in the groove is to be explained specifically.

At first, a disk to be measured is set to an evaluation tester and rotated. Then, an optical head is moved to the vicinity of the track for which the radial tilt amount is measured. Auto-focusing is applied at that place and tracking error signals (differential signal) are monitored by an oscilloscope. Then, the gain for the auto-focusing is controlled such that the amplitude of the tracking error signal in the groove is maximized (AF offset control). Then, tracking is applied to the groove in a state of applying auto-focusing. Then, recording is conducted while changing the laser power by a random signals and a recording power at which the displacement of the center line for an envelope of signals corresponding to 3T (shortest) mark and space from the center line for an envelope of signals corresponding to longer mark and space (asymmetry) is +5% (5% on the side of the amorphous level) is determined to define it as an optimal recording power. Then, a relation between the radial tilt and the jitter value after 10 cycles of overwriting (optimal power) is measured by a time interval analyzer (TIA), to determine the radial tilt that minimizes the jitter. That is, while changing the radial tilt, current jitter is measured to determine the radial tilt that minimizes the jitter, and this is defined as an optimal radial-Tilt. Then, the tracking offset adjustment is controlled. At first, overwriting is conducted for 10 cycles at an optimal power on both sides of the groove. Subsequently, the cross talk from the land in the groove is measured by a spectrum analyzer. The tracking gain is adjusted so as to minimize the cross talk. It is further preferred that the optimal radial-Tilt is determined once again and the tracking offset is controlled subsequently.

Finally, after conducting the AF offset adjustment, tracking offset adjustment and radial-Tilt adjustment for the groove, the beam is moved to a track that measures the stress deformation amount of groove. Regenerated signals for the ID areas (areas portions representing the address information by bits) arranged each being displaced by ½ track to right and left of the track (sum signals) were monitored and a voltage amplitude V1 and a voltage amplitude V3 for ID1 and ID3, respectively, were measured. Based on the values, the stress deformation amount of groove GD represented as:

$$GD = |(V1-V3)/(V1+V3)|$$

is calculated.

In the same manner, the stress deformation amount of the groove for the land is measured.

(Feature of Disk with Reduced Thickness of Lower Protective Layer)

Figure 10:
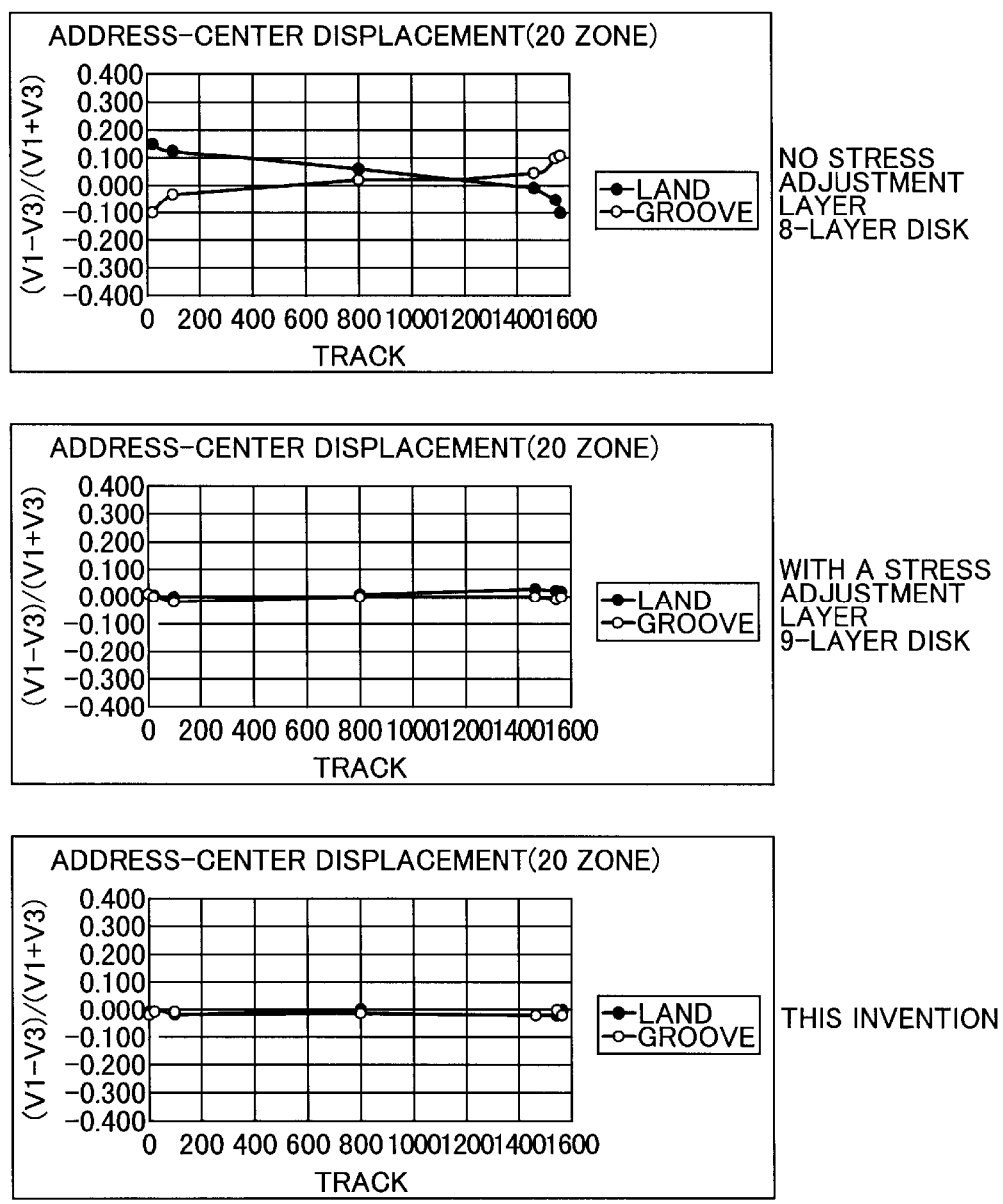
FIG. 10 shows a relation between the track number and the groove deformed amount in the information recording medium according to this invention and comparative example.

In the disk described above, at least one of the forming three features is present according to the measuring method described above. One of them is that the curve for (V1−V3)/(V1+V3) is nearly horizontal as shown by the invention in FIG. 10, and the value is contained within a range of 0.1 in central 80% track except for 10% tracks on both ends of the zone and shows abrupt change only in the 10% tracks on both ends. In a comparative disk of large stress, the value (V1−V3)/(V1+V3) changes from the inner circumference to the outer circumference even in the tracks at the zone central area as shown by Comparative Examples 1 and 2 in FIG. 10 and the value changes in the opposite directions for the land and the groove in the land/groove recording disk. The second feature is that the curve for (V1−V3)/(V1+V3) for any one of land or groove increases from the inner circumference to the outer circumference not in the monotonous increase or monotonous decrease but has a portion as shown in Comparative Examples 1 and 2 in FIG. 10 in which value decreases after increase or increases after decrease. Although it is not impossible to adjust stress so as not to include the abrupt changing portions at both ends or a portion not increasing monotonously or not decreasing monotonously but this tends to cause cracks when a portion of the film undergoes excessive and the temperature of the disk changes greatly.

EXAMPLE 2

Comparative Example 3

A disk in which only the thickness of the lower protective layer was changed from the disk of Example 1 (Comparative Example 3) was prepared and the radial tilt and the stress deformation amount of groove were measured. There was no problem in the disk of Example 1 but, when the thickness of the lower protective layer was increased to 80 nm, the radial tilt was worsened from 0 to 0.8 and the value (V1−V3)/(V1+V3) was worsened from 0 to −0.034 before and after the film preparation. Then it was found that heat upon film preparation is effectuated on the occurrence of stress by preparation of the lower protective film.

Then when the dependence of the radial tilt on the thickness of the substrate was measured, the following result was obtained. When disks with different thickness for the substrate were prepared with the thickness of the lower protective layer being fixed to 80 nm and examined for the groove at the outer circumferential area, the following result was obtained.

| Substrate thickness (mm) | Radial tilt (degree) |
|---|---|
| 0.4 | 1.2 |
| 0.6 | 0.8 |
| 0.7 | 0.7 |
| 0.8 | 0.2 |
| 1.2 | 0.05 |

A substrate of reduced thickness is suitable to high density recording since a focusing lens of large NA can be used but when the thickness of the substrate is as thin as 0.7 mm or less, the amount of tilt is large. When the radial tilt is 0.7 degree or more, it is difficult to bond two sheets of substrates of 0.6 mm thickness and spot aberration increases to distort the regenerated waveforms so that stress has to be reduced.

Further, when the dependence of the stress deformation amount of groove on the track pitch was measured, the following result was obtained. Substrates at a thickness of 0.6 mm and 0.8 were used with the lower protective layer being fixed to 80 nm.

| | (V1 − V3)/(V1 + V3) | |
|---|---|---|
| Track pitch ($\mu$m) | Substrate of 0.8 mm thickness | Substrate of 0.6 mm thickness |
| 0.54 | −0.038 | −0.040 |
| 0.615 | −0.029 | −0.034 |
| 0.65 | −0.026 | −0.0305 |
| 0.70 | −0.023 | −0.022 |
| 0.78 | −0.016 | −0.018 |

Thus, as the track pitch is larger, the absolute value (V1−V3)/(V1+V3) decreases. In the substrate at a thickness of 0.6 mm, the absolute value: (V1−V3)/(V1+V3) increases as 0.03 or more to result in the following problems, so that the stress has to be reduced. When the track pitch is large, while the stress deformation amount of groove can be moderated but it is not suitable to high density recording.

While no problems were caused in the disk described in Example 1, disks formed quite in the same manner as described above except for increasing the thickness of the lower protective layer to 80 nm, the positional relation in the radial direction of the disk between the pits expressing the address information in the pre-formatted area and the recording mark recorded in the user's data area is not in a correct relation being displaced by ½ track pitch but it displaced to the outer circumferential direction at the inner circumference of the radial zone and displaced to the inner circumferential direction at the outer circumference in a range within about ¾ of the central portion in each sector.

Accordingly, when the tracking was corrected at the pit position of the pre-formatted area, recording was conducted being deviated from the track center determined by the groove in the sector central area, to cause cross erase of eliminating a portion of the recording marks of adjacent tracks. Further, when 1 zone (about 1600 tracks) are overwritten repeatedly for 100 cycles, this resulted in a phenomenon of bending the tracks to the outer circumferential direction in an area near the center of the zone and near the center of the sector, which also caused cross erase.

Further, while no problems were formed in the disk described in Example 1, disks formed quite in the same manner except for increasing the thickness of the lower protective layer to 130 nm caused a problem upon rewriting a number of tracks by multi-cycles. This is a problem that the surface of the substrate expands due to the heat upon recording tending to cause deformation when a number of tracks are rewritten by overwriting and since it takes a considerable time for the expansion to resume the original state, expansion accumulates progressively by repeating overwriting for a number of tracks by multi-cycles and the tracking grooves are bent in the direction of undergoing the force by the stress of the stacked films on the substrate to such an extent that the address data in a pre-formatted area can no more be read. The bending is larger toward the vicinity of the center of the multi-cycle recording area. This problem was also overcome by reducing the stress as in the disk described in Example 1.

EXAMPLE 3

Comparative Example 4

A disk in which only the thickness of the lower protective layer was changed from the disk of Example 1 (Comparative Example 4) was prepared and the stress deformation amount of groove was measured. Disks with the thickness of the obtained lower protective layer being fixed to 80 and having 0.6 micron and 0.7 micron track pitched were used.

| Lower protective layer | (V1 − V3)/(V1 + V3) | |
|---|---|---|
| thickness (nm) | 0.6 $\mu$m | 0.74 $\mu$m |
| 200 | 0.091 | 0.053 |
| 130 | 0.053 | 0.028 |
| 100 | 0.043 | 0.019 |
| 60 | 0.029 | 0.006 |
| 40 | 0.017 | 0.003 |
| 30 | 0.014 | 0.001 |
| 20 | 0.010 | 0.001 |

From the result, it has been found that the stress can be reduced as the thickness of the lower protective layer is reduced. A track pitch of 0.6 $\mu$m and a thickness of the lower protective layer of 60 nm were suitable to high density recording.

Those matters not described in this example are identical with those in Example 1.

EXAMPLE 4

This Example—2

A disk was manufactured by forming a reflectance improving layer further between the substrate and the lower protective layer of the disk in Example 1 and adding a second reflective layer on the reflective layer, and the writing/reading characteristics were measured. The medium was manufactured as described below.

At first, a reflectance improving layer of 5 nm thickness comprising $(SiO_2)_{20}(ZnS)_{80}$ and a lower protective layer 2 of 20 nm thickness comprising $Al_2O_3$ were formed on a polycarbonate substrate 1 of about 12 cm diameter and 0.6 mm thickness and having, on the surface tracking grooves for land/groove recording at a track pitch of 0.615 $\mu$m and having pit trains representing address information at a position displaced from the track center, that is, substantially on an extension of a boundary line between land and groove. Then, a lower interface layer 3 comprising a $Cr_2O_3$ was formed to a thickness of 2 nm and, successively, a recording film 4 of 10 nm thickness comprising $Ge_2Sb_2Te_5$, an upper interface layer of 5 nm thickness comprising $Cr_2O_3$, an upper protective layer of 30 nm thickness comprising $(SiO_2)_{20}(ZnS)_{80}$, a reflective layer of 40 nm thickness comprising Cr and a second reflective layer of 40 nm thickness comprising $(SiO_2)_{20}(ZnS)_{80}$ were successively formed.

As described above, the information recording medium described in Example 4 has constituent films increased by two layers compared with the information recording medium described in Example 1 and has entire thickness increased by about 45 nm but the entire film thickness is 150 nm or less and it excellent in mass productivity compared with Existent disks. Since the optical interference could be made more effective by the reflectance improving layer and the second reflective layer, contrast could be improve by 3%. Further, since the film thickness in the upper and lower portions was increased, the fluctuation in the reflectance could be suppressed by 5% upon multi-time recording.

As described above, the information recording medium described in Example 4 is formed of 8-layer or less of stacked films and can be prepared by a mass producing apparatus having a sputtering device with 8 or less chambers. While the total manufacturing time increases by so much as two layers compared with the 6-layer constitution, tact could be made in the same manner and improvement for the multiple overwriting characteristics of 10,000 cycles or more was possible. As the material for the second reflective layer, those materials having n or k different by 2 or more from the material for the reflective layer in those materials as described in Example 1 for the reflective layer material, the lower protective layer material, the interface layer material are preferred. When those materials comprising at least one element of Au, Ag, Cu and Al as the main ingredient are used for the second reflective layer, they provided effects of increasing the thermal conductivity, increasing the thermal diffusion and causing the thermal diffusion relatively in the vertical direction (direction of thickness) thereby capable of preventing cross erase (partial erase of recording marks in adjacent tracks). Typical materials include Ag—Pd—Cu alloy such as $Ag_{96}Pd_4Cu_2$, Al—Ag alloy such as $Al_{50}Ag_{50}$, Al—Cr alloy such as $Al_{60}Cr_{40}$, and Ag—Cr alloy such as $Ag_{60}Cr_{40}$. As the material for the first reflective layer, those materials used for the reflective layer material described in Example 1 having n of 2.5 or more are preferred. When k is 1 or more, preferably, 2 or more, the material also has an effect of improving the difference of the absorption between the crystalline state and the amorphous state of the recording film.

Where the second reflective layers is a metal layer, a preferred range for the layer thickness is within a range from 10 nm to 60 nm for attaining an appropriate heat diffusion. Where the second reflective layer comprises a dielectric material such as an oxide, a range greater by 10 nm than described above is preferred.

The material for the reflectance improving layer includes those materials for the lower protective layer described in Example 1 and those having n different by 0.1 or more from the lower protective layer are preferred.

The reflectance improving layer may be saved. For serving the lower protective layer also as the reflectance improving layer, those materials with a refractivity index of smaller than 1 are preferred. A mixed $SiO_2$—$In_2O_3$ material such as $(SiO_2)_{70}(In_2O_3)_{30}$, a mixed $SiO_2$—$SnO_2$ material such as $(SiO_2)_{70}(SnO_2)_{30}$, a mixed material comprising 60 to 80 mol % of $SiO_2$ and a material at least containing In, Sn and O referred to as ITO, and a mixed $SiO_2$—ZnO material such as $(SiO_2)_{70}(ZnO)_{30}$ provided a preferred result. The material containing Sn can serve also as the interface layer. When the material serves also as the interface layer, the crystallization rate of the recording film could be improved by incorporation 5 to 50 atomic % of nitrogen. Since the materials contain oxides of low electric resistance compared with $SiO_2$, there is a possibility of shortening the tact time by DC sputtering.

When the refractive index of the lower protective layer is made substantially identical with that of the substrate (difference of refractive index of 0.15 or less, within a range from 1.43 to 1.73 in a case of polycarbonate substrate), since there is no substantial difference with respect to the substrate with an optical point of view, the film thickness may be optically optional. Accordingly, the materials can provide advantageous feature also in a case of increasing the thickness of the lower protective layer in excess of 60 nm in order to avoid excess temperature elevation in the substrate. In this case, the content of $SiO_2$ is preferably 55% to 80% by molar ratio.

When not only the reflectance improving layer is saved but also the first reflective layer and the second reflective layer are joined in this example, it has a 6-layered structure and can be formed easily by an inexpensive sputtering device. For this purpose, those materials mainly containing at least one element of Cr, Ni, Co, Mo, Ti, Mn, Ta, W, Nb, Pt, Pd and Re, that is, a material with the content of 70 atomic % or more, or an alloy comprising them and at least one element of Au, Ag, Cu and Al, particularly, $Cr_{50}Al_{50}$ or $Cr_{50}Ag_{50}$ in which the Ag content is 30 atomic % to 60 atomic % are preferred since the optical characteristic and the thermal characteristic are compatible. On the other hand, the $Cr_2O_3$ layer as the interface layer on the side of the reflective layer and the upper protective layer may be joined together. In this case, since it is required that the material has low thermal conductivity and stable material causing less mutual diffusion with respect to the recording film, those (In—Sn—O) materials containing 85 to 95% of $In_2O_3$ and 5 to 15 mol % of $SnO_2$ referred to as ITO, Sn—O series Marilee such as $SnO_2$ or composite oxides or oxynitride materials such as Sn—O—N are suitable.

Referring collectively, a satisfactory result could be obtained in a 6-layered structure comprising lower protective layer of mixed $SiO_2$—$SnO_2$ material/interface layer of $Cr_2O_3$/recording film/upper protective layer of Sn—O—N/ first reflective layer of Cr/second reflective layer of Ag alloy or Al alloy, or a 6-layered structure comprising lower protective layer of $SiO_2$—$Cr_2O_3$/recording film/interface layer of $Cr_2O_3$/upper protective layer of ZnS—$SiO_2$/first reflective layer of Cr/second reflective layer of Ag alloy or Al alloy, or a 6-layered structure comprising a lower protective layer of $SiO_2$—$SnO_2$/lower interface layer of $Cr_2O_3$/ recording film/upper interface layer of $Cr_2O_3$/upper protective layer of ZnS—$SiO_2$/reflective layer of Ti—Al.

When a mixed oxide of $SiO_2$—$SnO_2$ such as $(SiO_2)_{65}$ $(SnO_2)_{35}$ or an oxynitride in which 40% or less of the total number of atoms is substituted with nitrogen is used instead of $Al_2O_3$ used for the lower protective layer, peeling less occurs under usual conditions even when the $Cr_2O_3$ lower interface layer is saved.

A substantially the same effect could be obtained by using ITO (known transparent electrode material at least containing In, Sn and O) instead of $In_2O_3$ used in this example.

A preferred range for the thickness of the reflectance improving layer is within a range from 3 nm to 30 nm. Those matters not described in this example, for example, preferred materials and the range of thickness for the lower protective layer, the upper protective layer and the upper and lower interface layers and the first reflective layer are identical with those in Example 1.

EXAMPLE 5

Comparative Example 2, 1
(Constitution, Manufacturing Method)

Figure 14:
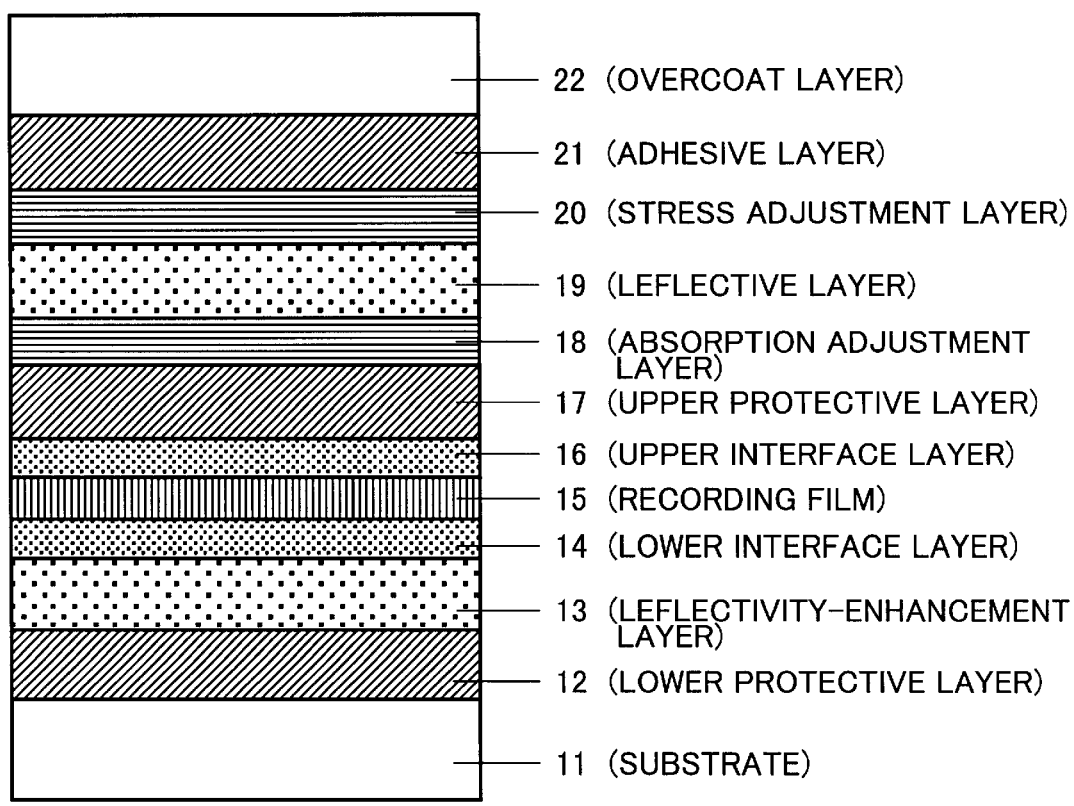
FIG. 14 is a schematic cross sectional view for an example of an information recording medium according to the prior art.

FIG. 14 shows a cross sectional structural view of a disk-like information recording medium of a first example in the existent examples (Comparative Example 2). The medium was manufactured as described below.

At first, a lower protective layer 12 comprising ZnS—$SiO_2$ film was formed to 110 nm thickness on a polycarbonate substrate 11 of 12 cm diameter and 0.6 mm thickness having, on the surface, tracking grooves for land/groove recording each with a track pitch of 0.6 μm and having a pit train expressing address information or the like substantially on an extension line from a boundary line between the land and the groove. Then, a reflective improving layer 13 of 25 nm thickness comprising $Al_2O_3$ film, a lower interface layer 14 of 1 nm thickness comprising a $Cr_2O_3$ film, a recording film 15 of 7 nm thickness in average comprising $Ge_7Sb_4Te_{13}$, an upper interface layer 16 of 5 nm thickness comprising $Cr_2O_3$ film, an upper protective layer 17 of 20 nm thickness comprising a ZnS—$SiO_2$ film, an absorptivity adjusting layer 18 of 38 nm thickness comprising a $(Cr)_{75}$ $(Cr_2O_3)_{25}$ film, a reflective layer 19 of 30 nm thickness comprising an $Al_{99}Ti_1$ film and a stress adjusting layer 20 of 120 nm thickness comprising Ti were formed successively under an Ar gas flow rate of 170 sccm. Each of the compositional ratio is based on atomic %. The films were formed by using a magnetron sputtering device. After obtaining the first disk member, a 8-layered structure disk saving the uppermost stress adjusting layer in the 9-layered structure described above (Comparative Example 1) was also manufactured. The disks are bonded at the uppermost surface by way of an adhesion layer with a protective substrate.

Scarce difference is observed for the reflectance and the transmittance at each of wavelength between the two kinds of discs as viewed from the side of the substrate. In the 8-layered structure disk saving the stress adjusting layer (Comparative Example 1), warp of the substrate changed in the direction in which the outer circumference of the substrate suspended downwardly with the film-formed surface being upside, showing that compressive stress exerts from the substrate to the films. Further, the disks of the existent examples having the entire film thickness of 200 nm or more are poor in the productivity.

Figure 11:
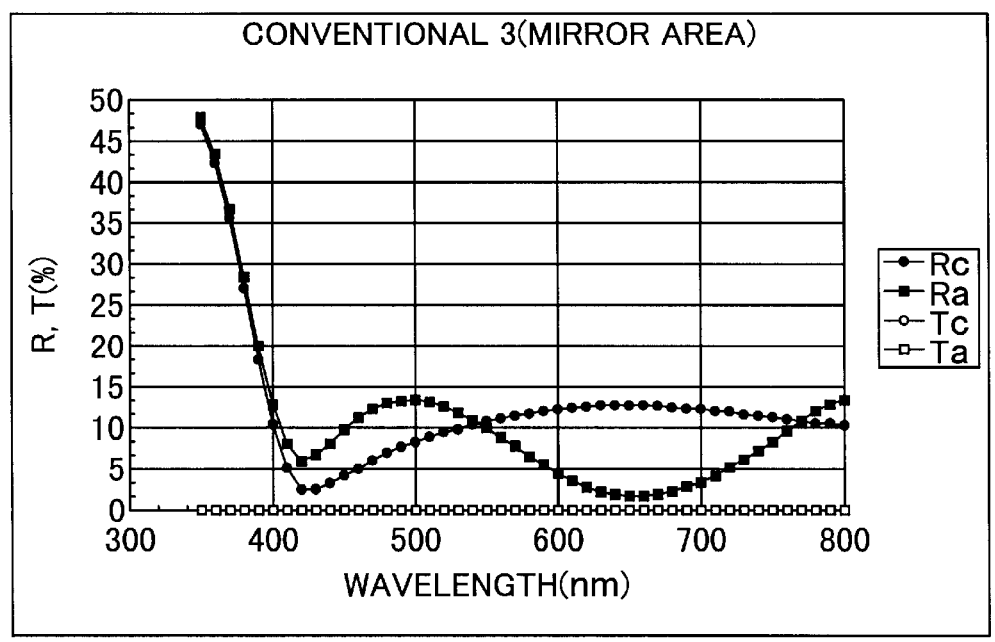
FIG. 11 shows optical characteristics of an information recording medium according to the prior art.
Figure 11:
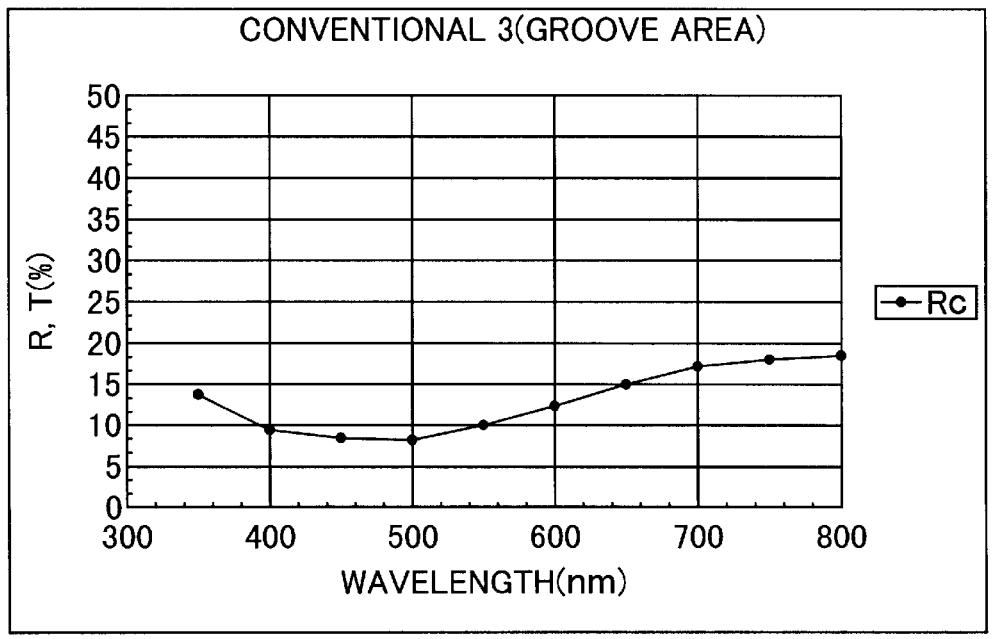
Figure 12:
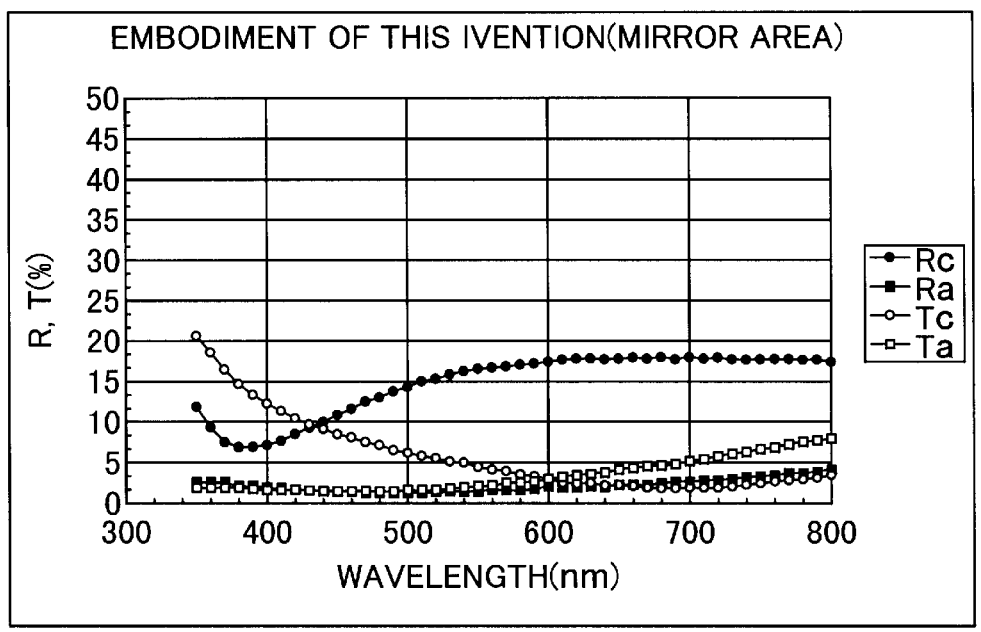
FIG. 12 shows optical characteristics of an information recording medium according to this invention.
Figure 12:
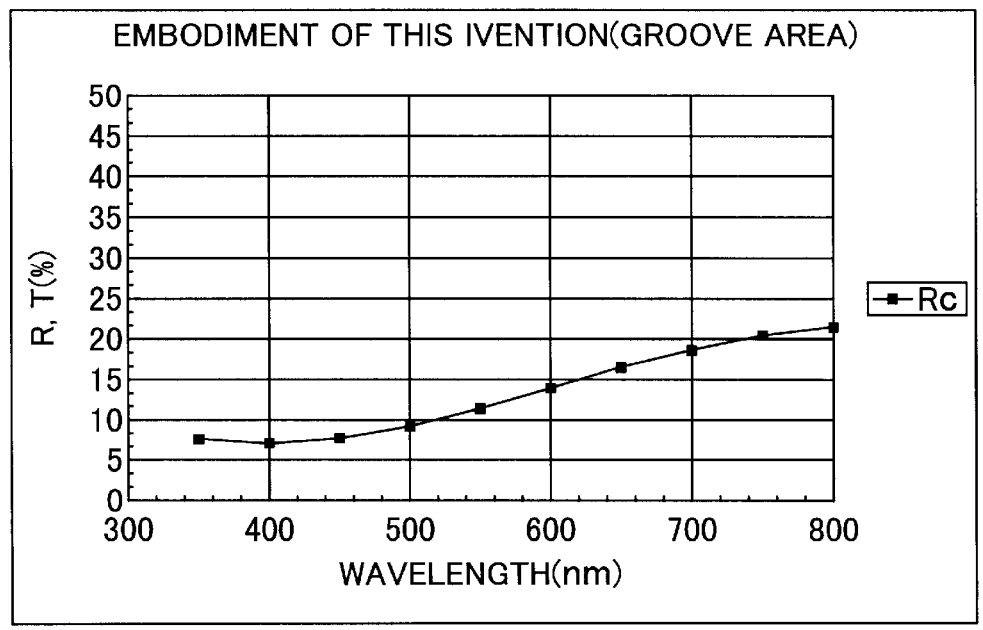

When the reflectance at each wavelength as viewed from the side of the substrate was measured for the information recording area and the mirror area of the disk of the existent example described in Example 5 by a spectrometer, a result shown in FIG. 11 was obtained. When the reflectance at each wavelength as viewed from the side of the substrate was measured also in the same manner for the information recording area and the mirror area of the disk according to this invention described in Example 1, the result shown in FIG. 12 was obtained. The mirror area is a portion where the substrate is flat with no grooves, which is present at the inner circumference or the outer circumference of the recording region in the disk not yet formatted. The reflectance and the transmittance were measured for the region after initialization for the crystalline state and for the not yet initialized region for the amorphous state.

As described above, the reflectance in the amorphous state in the mirror area of the existent disk has a minimum value in a range from 610 nm to 710 nm which is near the writing/reading wavelength. The minimum value was less than 10% when examined for plural existent disk mirror areas. The difference between the minimum value and the maximum value in a range from 520 nm to 600 nm and 800 nm is 8% or less. The reflectance in the crystalline state has a maximum value in a range from 610 nm to 710 nm. The maximum value was 10% to 25% when examined for plural existent disk mirror areas.

Further, the levels of the reflectance in the amorphous state and in the crystalline state are inverted respectively, in a region from 500 nm to 600 nm at a shorter wavelength than the writing/reading wavelength. Such optical feature is attributable to that the thickness of the lower protective layer is large. At a further shorter wavelength, the reflectance in the amorphous state and in the crystalline state has a minimum value in a range from 360 nm to 500 nm. Such optical features is attributable to that the thickness of the lower protective layer film is large.

Further, the transmittance in the amorphous state and in the crystalline state in the mirror area of existent discs is about less than 1% in a range from 610 nm to 710 nm. Such optical features is attributable to that the thickness of the reflective layers is large and the layer do not transmit the light.

On the other hand, when the reflectance is measured through the information recording area having tracking grooves of the disk for land/groove recording, a result different from that of the mirror area was obtained. The optical feature is different from that of the mirror area by the effect of interference of the groove on the light, and it was an intense a trend that the reflectance was lowered compared with the mirror area as the wavelength was shorter at a wavelength shorter than the groove width (about 615 nm), while the reflectance increased as the wavelength was longer at a longer wavelength, so that reflectance could not be measured accurately.

On the other hand, the reflectance in the amorphous state in the mirror area of the disk according to the invention described in Example 1, shows no scarce change in a range from 610 nm to 710 nm near the writing/reading wave length. Within a range from 500 nm to 600 nm, the reflectance is higher in the crystalline state than that in the amorphous state at all wavelength.

The reflectance in the crystalline state was 15% to 25% in a range from 610 nm and 710 nm, while the reflectance was 5% or less in the amorphous state.

Such optical features are attributable to that the thickness of the lower protective layer is small. At the lower wavelength, the reflectance in the amorphous state has no minimum value in a range from 360 nm to 500 nm. Such optical feature is attributable to that the thickness of the lower protective layer is small. Further, the transmittance in the amorphous state and in the crystalline state in the mirror area of the disk according to the invention as described in Example 1 is about 2% or more in a range from 610 nm to 710 nm. Such optical features is attributable to that the thickness of the reflective layer is small and the layer properly transmits light.

Further, when the reflectance is measured through the grooves having tracking grooves of the disk for land/groove recording, a result different from that of the mirror area is obtained. Such optical features is different from the mirror area due to the effect of the groove interfering on the light and there was observed an intense trend that the reflectance was lowered compared with that in the mirror area as the wavelength is shortened as a wavelength smaller than the widths of the groove (about 615 nm), while the reflectance was increased at the wavelength is longer at a long wavelength, so that the reflectance could not be measured accurately.

EXAMPLE 6

Comparative Example 4
(Constitution, Manufacturing Method)

Figure 13:
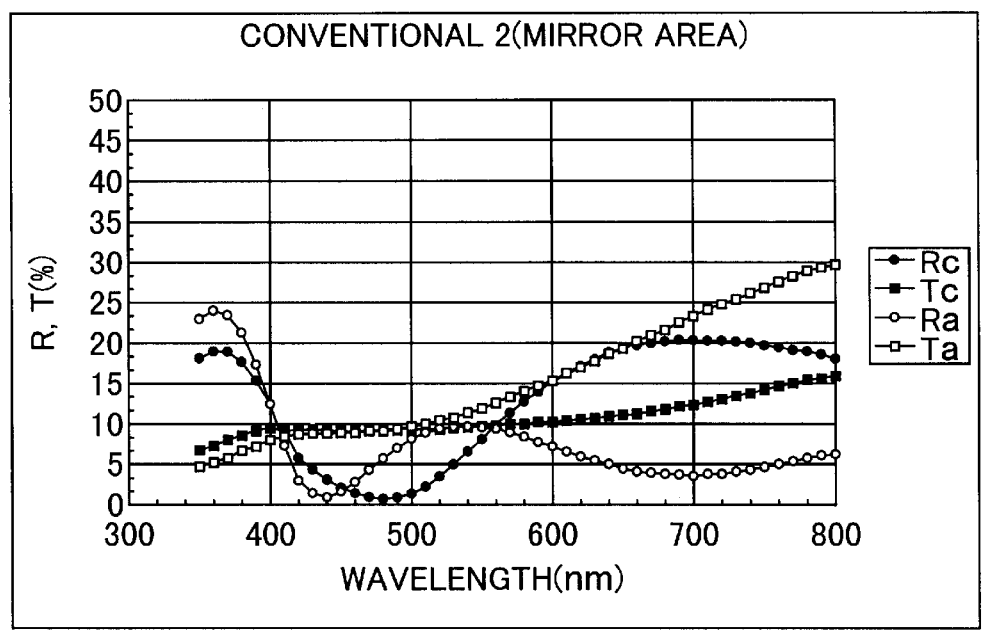
FIG. 13 shows optical characteristics of an information recording medium according to the prior art.

A disk of Example 1 while changing only the thickness of the lower protective layer to 130 nm was manufactured (Comparative Example 4) and the reflectance and transmittance were measured in the same manner as in Example 5. When the reflectance at each wavelength as viewed from the side of the substrate was measured for the mirror area of the disk in the existent example (Comparative Example 4) described in Example 6 was measured, a result shown in FIG. 13 was obtained.

As described above, the reflectance in the amorphous state in the mirror area of the existent disk has a minimum value in a range from 610 nm to 710 nm near the writing/reading wavelength. The minimum value was less than 10% when examined for the mirror area in plural existent disks. The difference between the minimum value and the maximum value in a range from 500 nm to 660 n is at 5% or more. The reflectance in the crystalline state had a maximum value in the range from 610 nm to 710 nm. When plural mirror areas of the existent disks were examined, the maximum value was 10% to 25%. Further, the levels of the reflectance in the amorphous state and in the crystalline state are inverted, respectively, within the range from the writing/reading wavelength to a wavelength 140 nm longer, that is, in a range from 520 nm to 660 nm. Such optical feature is attributable to that the thickness of the lower protective layer is large. At the shorter wavelength, the reflectance in the amorphous state and in the crystalline state has a minimum value in the range from 400 nm to 500 nm. Such optical features are attributable to that the thickness of the lower protective layer is large. Further, the transmittance in the amorphous state and in the crystalline state in the mirror area of the existent disks is about 1% or more in a range from 610 nm to 710 nm. Such optical feature is attributable to that the thickness of the reflective layer is thin and it properly transmits the light. Measurement described above may be conducted in such a place that does not undergoing no effects of the groove in the disk instead of the mirror area.

EXAMPLE 7

Example of the Invention
(Constitution, Manufacturing Method)

A disk of Example 1 changing only the thickness for each layer in the disk was manufactured and the stress deformation amount of the groove was measured in the same manner as in Example 1.

A cross sectional structural view of a disk-like information recording medium of this example is shown. The medium was manufactured as described below. At first, a lower protective layer 12 comprising $(SiO_2)_{40}(ZnO)_{60}$ film was formed to the following thickness, on a polycarbonate substrate 11 of 12 cm diameter and 0.6 mm thickness having on the surface, tracking grooves for land/groove recording with a track pitch of 0.615 μm and having a pit train expressing address information or the like substantially on an extension line from a boundary line between the land and the groove. Then, a lower interface layer 3 comprising a $Cr_2O_3$ film was formed to a thickness of 5 nm and, successively, a recording film 4 of 10 nm thickness comprising $Ge_2Sb_2Te_5$, an upper interface layer of 5 nm thickness comprising $Cr_2O_3$, an upper protective layer of 40 nm thickness comprising $(SiO_2)_{20}(ZnS)_{80}$ and a reflective layer comprising Cr were formed successively to the following thickness.

The result of the measurement for the stress deformation amount of groove, with the thickness of the reflective layer being set to 30 nm, was as shown below.

| Lower protective layer thickness (nm) | Total film thickness (nm) | (V1 − V3)/(V1 + V3) |
|---|---|---|
| 130 | 220 | −0.053 |
| 100 | 190 | −0.043 |
| 80 | 170 | −0.034 |
| 60 | 150 | −0.029 |
| 30 | 120 | −0.014 |
| 20 | 110 | −0.012 |
| 10 | 100 | −0.011 |

Then, the result of the measurement for the stress deformation amount of groove, with the thickness of the reflective layer being set to 60 nm, was as shown below.

| Lower protective layer thickness (nm) | Total film thickness (nm) | (V1 − V3)/(V1 + V3) |
|---|---|---|
| 130 | 250 | −0.053 |
| 100 | 220 | −0.043 |
| 80 | 200 | −0.040 |
| 60 | 180 | −0.034 |
| 30 | 150 | −0.029 |
| 20 | 140 | −0.026 |

From the result, it can be seen that the stress can be reduced as the total film thickness is thinner. It is preferred that the total film thickness of the stacked films is 150 nm or less, since the stress deformation amount of groove GD can be reduced as 0.03 or less. It has been found that the total thickness of the stacked film is more preferably 110 nm or less since the stress deformation amount of groove GD can be reduced as 0.012 or less.

Those matters not described in this example are identical with those in Example 1.

EXAMPLE 8

(Constitution and Manufacturing Method of Information Recording Medium of the Invention)

Disks were manufactured while changing the material for the lower protective layer, the material for reflective layer, the thickness of the lower protective layer (d), the track pitch (TP) and the entire thickness of the stacked film (t) from those of the disk in Example 1.

At first, a lower protective layer 2 comprising $(SiO_2)_{60}(In_2O_3)_{40}$ was formed to 30 nm thickness by DC sputtering on a polycarbonate substrate 1 of 12 cm diameter and 0.6 mm thickness having, on the surface, tracking grooves for land/groove recording with a track pitch of 0.615 $\mu$m and having a pit train expressing address information or the like substantially on an extension line from a boundary line between the land and the groove. Then, a lower interface layer 3 comprising a $Cr_2O_3$ film was formed to a thickness of 2 nm by RF sputtering and, successively, a recording film 4 of 10 nm thickness comprising $Ge_4Sb_2Te_7$, an upper interface layer of 3 nm thickness comprising $Cr_2O_3$, an upper protective layer of 30 nm thickness comprising $(SiO_2)_{20}(ZnS)_{80}$, a first reflective layer of 30 nm thickness comprising $Cr_{80}O_{20}$ and a second reflective layer of 15 nm thickness comprising $Ag_{98}Pd_1Cu_1$ were formed successively.

Then, jitter including the effect of cross erase after overwriting for 1000 cycles (hereinafter referred to as 1000 cycle overwrite jitter) was measured as below.

After overwriting random signals for 1000 cycles to the tracks, random signals were overwritten for ten cycles in an adjacent track and a jitter in the track after DC erasing the adjacent track was measured. When the track pitch was widened so as to make the disk capacity to 4.7 GB, the mark length was shortened. For example, when a track pitch is 0.62 to 0.72 $\mu$m, the shortest mark length is 0.42 to 0.36 $\mu$m.

Figure 15:
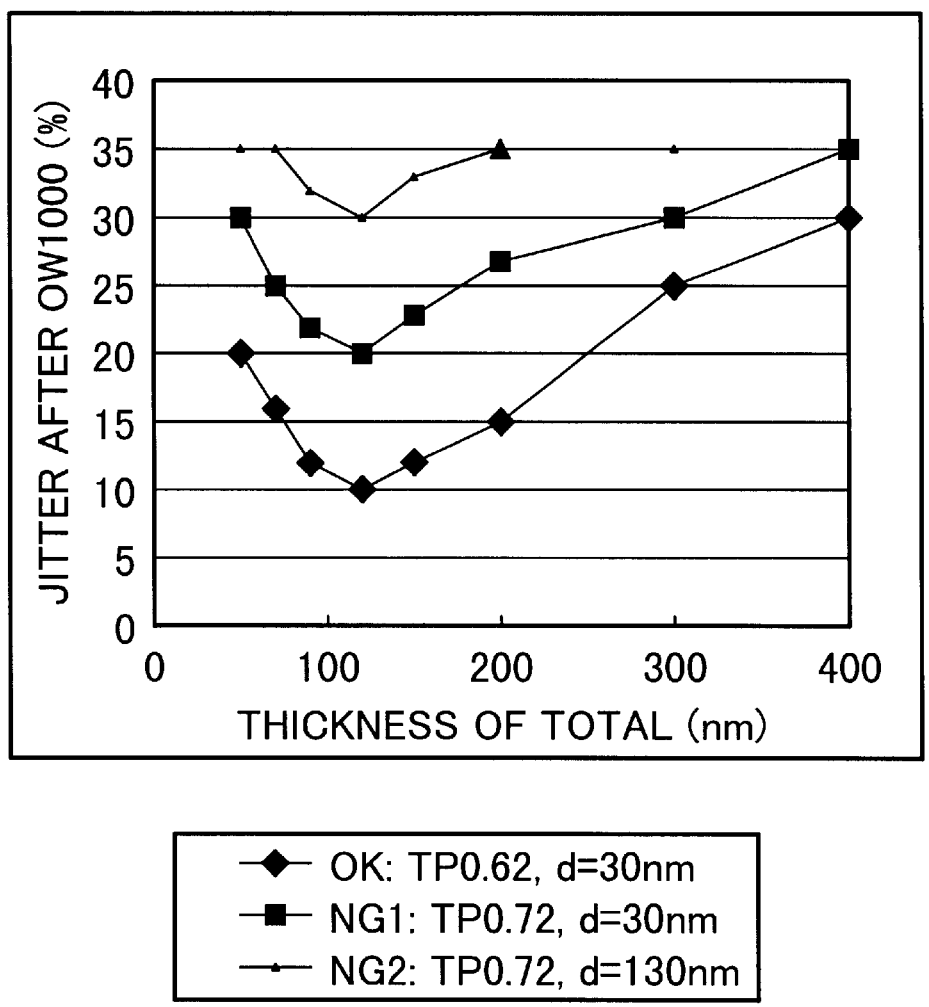
FIG. 15 shows the dependence of 1000 cycle overwrite jitter on the entire film thickness in the information recording medium according to this invention.

At first, when the dependence of 100 cycle overwrite jitter on the entire film thickness was examined under the condition A (track pitch 0.62 $\mu$m, lower protective layer thickness 30 nm), B (track pitch 0.72 $\mu$m, lower protective layer thickness 30 nm) and C (track pitch 0.72 $\mu$m, lower protective layer thickness 130 nm), the results shown in FIG. 15 and the following tables were obtained. The jitter value is represented for σ/window width by percentage.

| Entire film thickness (nm) | 1000 cycle overwrite jitter (%) | | |
|---|---|---|---|
| | Condition A | Condition B | Condition C |
| 50 | 20 | 30 | 35 |
| 70 | 16 | 25 | 35 |
| 90 | 12 | 22 | 32 |
| 120 | 10 | 20 | 30 |
| 150 | 12 | 23 | 33 |
| 200 | 15 | 27 | 35 |
| 300 | 25 | 30 | 35 |
| 400 | 30 | 35 | 35 |

Figure 16:
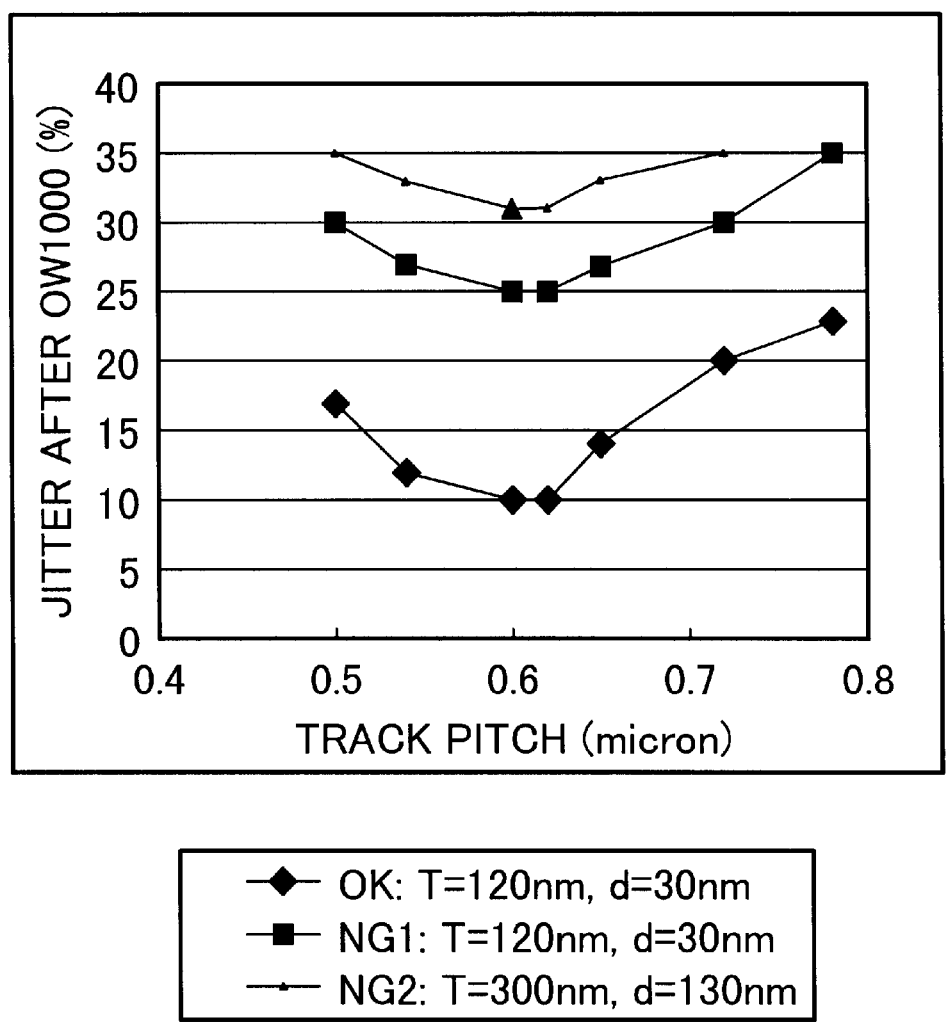
FIG. 16 shows the dependence of 1000 cycle overwrite jitter on the track pitch in the information recording medium according to this invention.

Then, when the dependence of 1000 cycle overwrite jitter on the track pitch was examined under the condition D (entire film thickness 120 nm, the lower protective layer film thickness 30 nm), E(entire film thickness 120 nm, the lower protective layer film thickness 30 nm), and F(entire film thickness 300 nm, the lower protective layer film thickness 130 nm), the results shown in FIG. 16 and the following tables were obtained.

| Track pitch ($\mu$m) | 1000 cycle overwrite jitter (%) | | |
|---|---|---|---|
| | Condition D | Condition E | Condition F |
| 0.50 | 17 | 30 | 35 |
| 0.54 | 12 | 27 | 33 |
| 0.60 | 10 | 25 | 31 |
| 0.62 | 10 | 25 | 31 |
| 0.65 | 14 | 27 | 33 |
| 0.72 | 20 | 30 | 35 |
| 0.78 | 23 | 35 | 35 |

Figure 17:
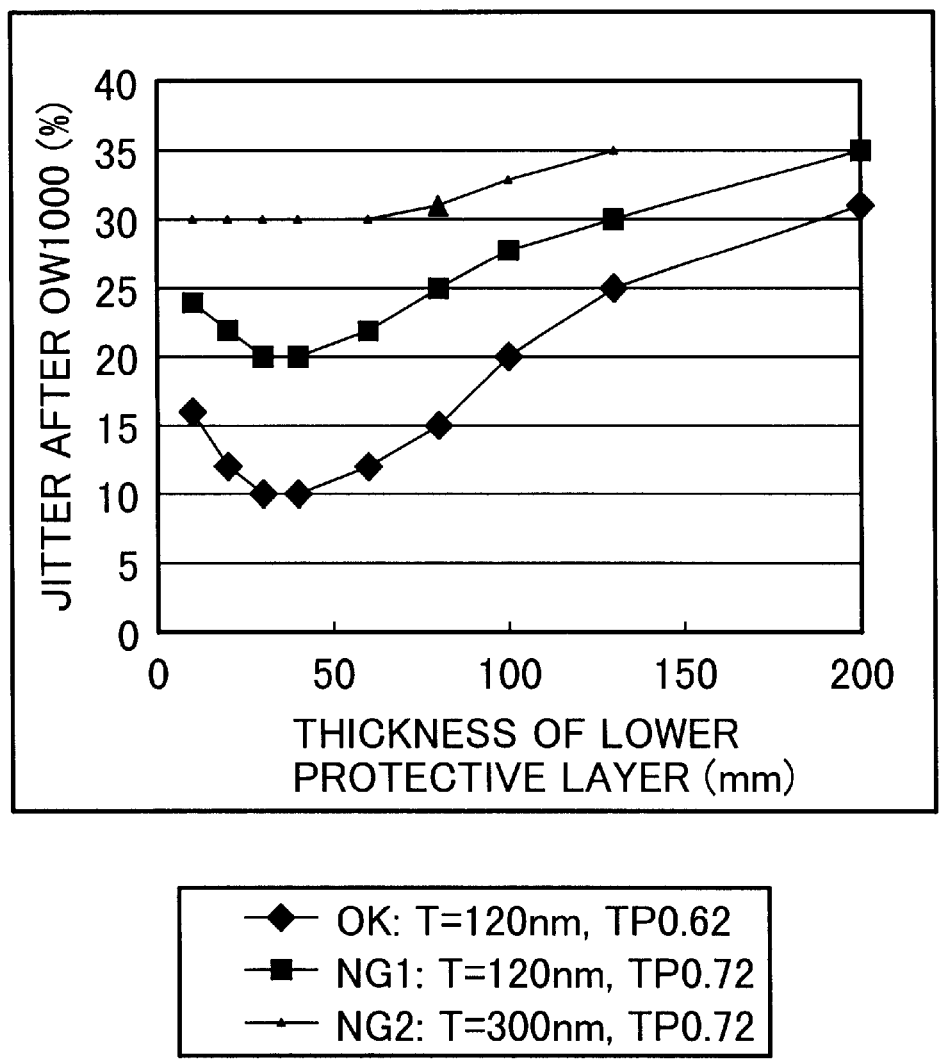
FIG. 17 shows the dependence of 1000 cycle overwrite jitter on the thickness of the lower protective film in the information recording medium according to this invention.

Finally, when the dependence of 1000 overwrite jitter on the entire film thickness was examined under the condition G (track pitch 0.62 $\mu$m, lower protective layer thickness 129 nm), H (track pitch 0.72 $\mu$m, lower protective layer thickness 120 nm) and I (track pitch 0.72 $\mu$m, lower protective layer thickness 300 nm), the results shown in FIG. 17 and the following tables were obtained.

| Lower protective layer thickness (nm) | 1000 cycle overwrite jitter (%) | | |
|---|---|---|---|
| | Condition G | Condition H | Condition I |
| 10 | 16 | 24 | 30 |
| 20 | 12 | 22 | 30 |
| 30 | 10 | 20 | 30 |
| 40 | 10 | 20 | 30 |
| 60 | 12 | 22 | 30 |
| 80 | 15 | 25 | 31 |
| 100 | 20 | 28 | 33 |
| 130 | 25 | 30 | 35 |
| 200 | 31 | 35 | 35 |

As described above it has been found that the 1000 cycle overwrite jitter is satisfactory when the thickness of the lower protective layer is 20 nm to 60 nm, the track pitch is 0.54 $\mu$m to 0.62 m and the entire film thickness is within a range of 90 nm to 150 nm. When any one of the lower protective layer thickness, the track pitch or the entire film thickness is out of the ranges described above, it is not preferred since the jitter is large as been in the conditions B, C, E, F, H and I. When the thickness of the lower protective layer is less than 20 nm, it is so thin that the substrate deteriorates to increase the jitter when overwriting is repeated. Further, when the thickness of the lower protective layer is 60 nm or more, since groove deformation is caused by stresses of the film upon film preparation, cross erase increases to worsen the jitter, although there is less degradation by rewriting. Further, when the track pitch is less than 0.54 $\mu$m, since the adjacent tracks are excessively close, jitter increases by cross erase. When the track pitch is 0.62 $\mu$m or more, although jitter does not increase by the cross erase, jitter is large because the mark length is short. When the entire film thickness is less than 90 nm, heat of the recording film tends to be conducted to the substrate or the adhesion layer to deteriorate them by overwrite and increase the jitter. When the entire film thickness is 150 nm or more, although there is less deterioration by rewriting, since groove deformation is caused by the stresses of the film upon film preparation, cross erase increases to worsen the jitter.

(Constitution and Manufacturing Method of Information Recording Medium of the Invention)

Disks were manufactured while changing only the material of the lower protective layer, the material of the reflective layer and the thickness for each of the layers from those of the disk in Example 1 and jitter and film preparation time were measured in the same manner as in Example 1.

At first, a lower protective layer 2 comprising $(SiO_2)_{70}(In_2O_3)_{30}$ was formed to 30 nm thickness on a polycarbonate substrate 1 of 12 cm diameter and 0.6 mm thickness having, on the surface, tracking grooves for land/groove recording with a track pitch of 0.615 μm and having a pit train expressing address information or the like substantially on an extension line from a boundary line between land and groove. Then, a lower interface layer 3 comprising a $Cr_2O_3$ film was formed to a thickness of 5 nm thickness and, successively, a recording film 4 of 10 nm thickness comprising $Ge_4Sb_2Te_7$, an upper interface layer of 3 nm thickness comprising $Cr_2O_3$, an upper protective layer of 30 nm thickness comprising $SnO_2$, a first reflective layer of 30 nm thickness comprising $Cr_{90}O_{10}$ and a second reflective layer of 15 nm thickness comprising $Ag_{98}Pd_1Cu_1$ were formed successively.

The tact for stacking is determined by the sputtering rate for each of the films and the thickness of the stacked films.

| | Constituent material | Film thickness (nm) | Stacking time (sec) |
|---|---|---|---|
| Lower protective layer | $(SiO_2)_{70}(In_2O_3)_{30}$ | 30 | 9 |
| Lower interface layer | $Cr_2O_3$ | 5 | 6 |
| Recording film | $Ge_2Sb_2Te_5$ | 10 | 6 |
| Upper interface layer | $Cr_2O_3$ | 5 | 6 |
| Upper protective layer | $SnO_2$ | 30 | 5 |
| First reflective layer | $Cr_{90}O_{10}$ | 30 | 9 |
| Second reflective layer | $Ag_{98}Pd_1Cu_1$ | 15 | 9 |

For restricting the stacking time of the lower protective layer and the first reflective layer that take much time among the layers described above within 12 sec, it is necessary that each of the layers is as thin as 40 nm or less.

As described above, since the information recording medium according to this invention has a thickness as thin as 40 nm or less for each of the stacked films, the stacking tact per 1 layer is short and mass productivity is excellent compared with existent disks.

The matters not described in this example, for example, the material and the range for the film thickness of the lower protective layer, the upper and lower interface layers, the upper protective layer and the first reflective layer are identical with those in Example 1. The material and the range of the film thickness for the second reflective layer are identical with those in Example 4.

As has been described above, this invention can provide an information recording medium capable of possessing favorable writing/reading characteristics at high density writing/reading, having large processing margin, capable of using a manufacturing apparatus at a reduced cost, excellent in view of material cost and mass productivity and with less stresses.

What is claimed is:

1. A multi-time rewritable information recording medium conducting writing by the change of arrangement of atoms under the irradiation of light, comprising, from the light-incident side,
   a substrate of a thickness of 0.7 mm or less,
   stacked films including:
   a lower protective layer of a thickness of 20 nm to 60 nm,
   a recording film,
   an upper protective layer, and
   a reflective layer,
   an adhesive layer,
   wherein the distance from the surface of the substrate to the adhesive layer is 150 nm or less, the thickness for each of the stacked films is 40 nm or less, and the interval between tracks is 0.62 μm or less.

2. A multi-time rewritable information recording medium conducting writing by the change of arrangement of atoms under the irradiation of light, comprising, from the light-incident side,
   a substrate of a thickness of 0.7 mm or less,
   stacked films including:
   a lower protective layer of a thickness of 10 nm to 60 nm,
   a recording film,
   an upper protective layer, and
   a reflective layer, and
   an adhesive layer,
   wherein the distance from the surface of the substrate to the adhesive layer is 150 nm or less, the thickness for each of the stacked films is 40 nm or less, and 90 atomic % or more for the material of the reflective layer comprises any one of Cr, Cr—Al, Cr—Ag, Cr—Au, Cr—Ge, or a Cr alloy as a main ingredient, an Al alloy such as Al—Ti, Al—Cr, Al—Co as a main ingredient, or Ge—Cr, Ge—Si, Ge—N, Co, Ni, Mo, Pt, W, Ge, Sb, Bi, Ag, Au or Cu.

3. A multi-time rewritable information recording medium conducting writing by the change of arrangement of atoms under the irradiation of light, comprising, from the light-incident side,
   a substrate of a thickness of 0.7 mm or less,
   stacked films including:
   a lower protective layer of a thickness of 20 nm to 60 nm,
   a recording film,
   an upper protective layer, and
   a reflective layer and
   an adhesive layer,
   wherein the distance from the surface of the substrate to the adhesive layer is 150 nm or less, the thickness for each of the stacked films is 40 nm or less, and 90 atomic % or more for the material of the lower protective layer comprises: any one of oxides of: $ZnS$—$SiO_2$, $ZnS$—$Al_2O_3$, $ZnS$—$Ta_2O_5$, $ZnS$—$SnO_2$, $ZnS$—$In_2O_3$, $ZnS$—$TiO_2$, $ZnS$—$Cr_2O_3$, $Zns$—$ZnO$ or $ZnO$, $SiO_2$, $Al_2O_3$, $Ta_2O_5$, $SnO_2$, $In_2O_3$, $TiO_2$, $SnO_2$—$In_2O_3$, $Cr_2O_3$, $ZnO$—$SiO_2$, $ZnO$—$In_2O_3$, $Al_2O_3$—$SiO_2$, $Ta_2O_5$—$SiO_2$, $SnO_2$—$SiO_2$, $In_2O_3$—$SiO_2$, $TiO_2$—$SiO_2$, $SnO_2$—$In_2O_3$—$SiO_2$, $Cr_2O_3SiO_2$, $ZnO$—$Al_2O_3$, $Ta_2O_5$—$Al_2O_3$, $SnO_2$—$Al_2O_3$, $In_2O_3$—$Al_2O_3$, $TiO_2$—$Al_2O_3$, $SnO_2$—$In_2O_3$—$Al_2O_3$ and $Cr_2O_3$—$Al_2O_3$;
   a mixture of the materials described above and the material formed by partially or entirely substituting the material described above with a nitride.

4. An information recording medium as defined in claim 2, wherein the distance between the tracks of the medium is 0.62 μm or less.

* * * * *